(12) United States Patent
Hayashi et al.

(10) Patent No.: US 7,397,591 B2
(45) Date of Patent: Jul. 8, 2008

(54) OPTICAL SCANNER AND IMAGE FORMING APPARATUS

(75) Inventors: Yoshinori Hayashi, Kanagawa (JP); Hiromichi Atsuumi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 11/873,635

(22) Filed: Oct. 17, 2007

(65) Prior Publication Data

US 2008/0043307 A1    Feb. 21, 2008

Related U.S. Application Data

(62) Division of application No. 11/609,796, filed on Dec. 12, 2006, now Pat. No. 7,298,537, which is a division of application No. 11/500,355, filed on Aug. 8, 2006, now Pat. No. 7,164,516, which is a division of application No. 10/866,043, filed on Jun. 14, 2004, now Pat. No. 7,106,483.

(30) Foreign Application Priority Data

| Jun. 12, 2003 | (JP) | ............................. 2003-167508 |
| Nov. 4, 2003 | (JP) | ............................. 2003-374378 |

(51) Int. Cl.
*G02B 26/08* (2006.01)

(52) U.S. Cl. .................... 359/205; 359/204; 359/207; 347/244

(58) Field of Classification Search ................ 359/204, 359/205, 207

See application file for complete search history.

(56) References Cited

U.S. PATENT DOCUMENTS

| 5,355,244 A | 10/1994 | Suzuki et al. |
| 5,453,870 A | 9/1995 | Iima |
| 5,459,601 A | 10/1995 | Suzuki et al. |

(Continued)

FOREIGN PATENT DOCUMENTS

| JP | 2001-21824 | 1/2001 |

(Continued)

OTHER PUBLICATIONS

U.S. Appl. No. 11/782,268, filed Jul. 24, 2007, Ichii et al.

(Continued)

*Primary Examiner*—James Phan
(74) *Attorney, Agent, or Firm*—Oblon, Spivak, McClelland, Maier & Neustadt, P.C.

(57) ABSTRACT

An optical scanner includes a light source, an optical coupler, an optical line image unit, a deflector, and an optical scanning unit. The optical scanning unit includes scanning lenses that guide the beams to a surface to be scanned. A surface on the deflector side of the scanning lens closest to a deflection reflecting surface has a negative power in a vertical scanning direction, and is a special toric surface in which a radius of curvature in a vertical scanning changes from an optical axis of the lens surface toward a periphery of the horizontal scanning direction. An F number of the beams toward the surface to be scanned of the scanning lens in the vertical scanning direction is larger in a peripheral part than in a central part in an effective scanning width.

2 Claims, 13 Drawing Sheets

U.S. PATENT DOCUMENTS

| | | | |
|---|---|---|---|
| 5,488,502 | A | 1/1996 | Saito |
| 5,570,224 | A | 10/1996 | Endo et al. |
| 5,606,181 | A | 2/1997 | Sakuma et al. |
| 5,684,618 | A | 11/1997 | Atsuumi |
| 6,069,724 | A | 5/2000 | Hayashi et al. |
| 6,081,386 | A | 6/2000 | Hayashi et al. |
| 6,104,522 | A | 8/2000 | Hayashi et al. |
| 6,185,026 | B1 | 2/2001 | Hayashi et al. |
| 6,198,562 | B1 | 3/2001 | Hayashi et al. |
| 6,229,638 | B1 | 5/2001 | Sakai et al. |
| 6,347,004 | B1 | 2/2002 | Suzuki et al. |
| 6,369,927 | B2 | 4/2002 | Hayashi |
| 6,417,509 | B1 | 7/2002 | Atsuumi et al. |
| 6,448,998 | B1 | 9/2002 | Suzuki et al. |
| 6,509,995 | B1 * | 1/2003 | Suzuki et al. ............... 359/196 |
| 7,050,210 | B2 | 5/2006 | Atsuumi et al. |
| 7,145,705 | B2 | 12/2006 | Hayashi |
| 7,154,651 | B2 | 12/2006 | Atsuumi et al. |
| 7,218,432 | B2 | 5/2007 | Ichii et al. |
| 7,236,281 | B2 | 6/2007 | Hayashi et al. |
| 7,271,823 | B2 | 9/2007 | Izumi et al. |
| 2002/0080428 | A1 | 6/2002 | Suzuki et al. |
| 2006/0077500 | A1 | 4/2006 | Hayashi et al. |
| 2007/0206261 | A1 | 9/2007 | Hayashi et al. |

FOREIGN PATENT DOCUMENTS

JP    2001-324689    11/2001

OTHER PUBLICATIONS

U.S. Appl. No. 11/844,643, filed Aug. 24, 2007, Saisho et al.
U.S. Appl. No. 11/877,020, filed Oct. 23, 2007, Hayashi et al.

* cited by examiner

Y=150.0

-0.20 — 0.20  X

AST, Z ———
AST, Y ------

-0.50 — 0.50  %

LINEAR ———
F-THETA ------

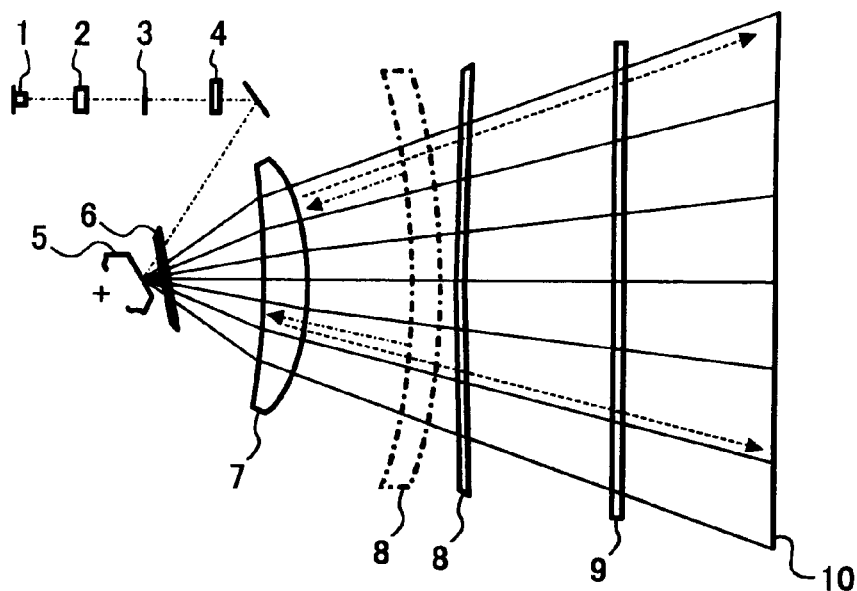
FIG. 10A
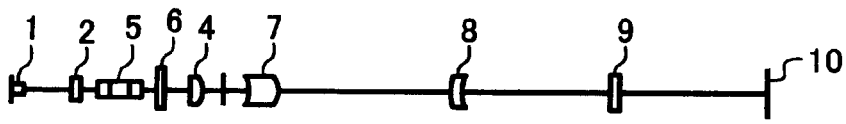
FIG. 10B
FIG. 11A
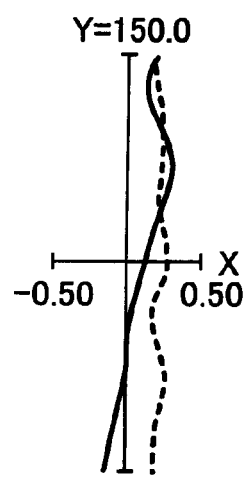
FIG. 11B
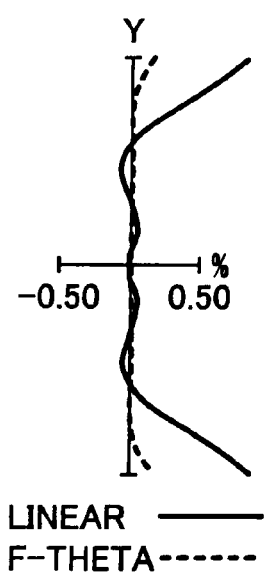

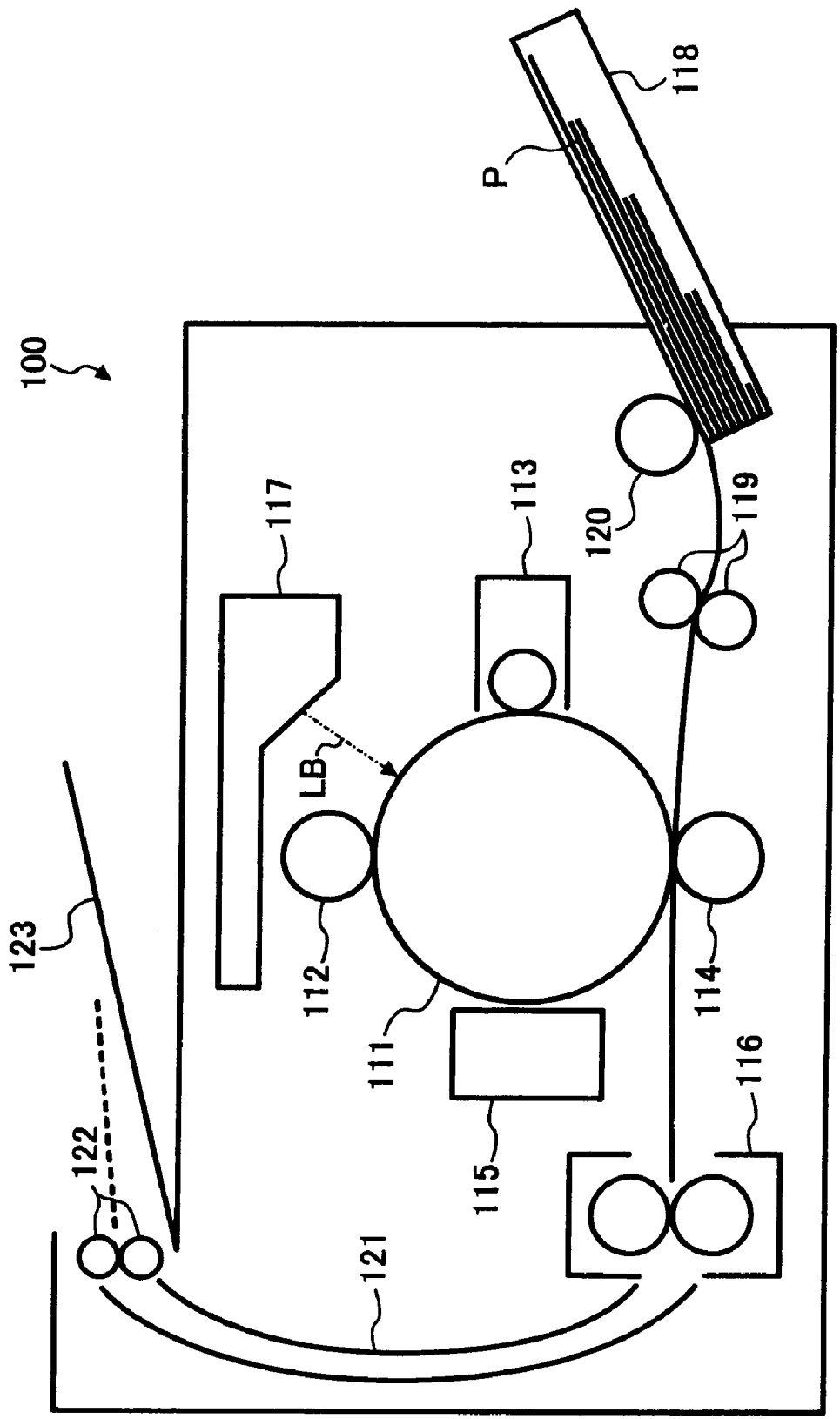

OPTICAL SCANNER AND IMAGE FORMING APPARATUS

CROSS-REFERENCE TO RELATED APPLICATIONS

The present document is a divisional of U.S. application Ser. No. 11/609,796, filed Dec. 12, 2006 now U.S. Pat. No. 7,298,537, which in turn is a divisional of U.S. application Ser. No. 11/500,355 filed on Aug. 8, 2006 now U.S. Pat. No. 7,164,516, which in turn is a divisional of U.S. application Ser. No. 10/866,043 filed on Jun. 14, 2004 now U.S. Pat. No. 7,106,483, and the present document incorporates by reference the entire contents of U.S. application Ser. Nos. 11/609,796, 11/500,355 and 10/866,043.

Further, the present document incorporates by reference the entire contents of Japanese priority document, 2003-167508 filed in Japan on Jun. 12, 2003.

BACKGROUND OF THE INVENTION

1) Field of the Invention

The present invention relates to an optical scanner and an image forming apparatus that can be used in a laser beam printer (LBP), a digital copier, a plain paper facsimile (PPF), and the like.

2) Description of the Related Art

In recent electrographic image forming apparatus such as a laser printer, densification of the image formed is speedy. To realize densification of the formed image, it is necessary to realize a small beam spot diameter for optical scanning on an image forming surface of an image carrier such as a photoconductor. The demand for such an optical scanner is increasing.

(1) To achieve a small beam spot diameter, Japanese Patent Application Laid-Open No. 2001-324689 proposes a two-lens scanning lens, with a special toric surface in which the radius of curvature in a vertical scanning section changes asymmetrically, toward the periphery of the horizontal scanning direction, from the optical axis of the lens surface, and the whole surface of the scanning lens is formed of the special toric surface.

(2) Further, Japanese Patent Application Laid-Open No. 2001-21824 proposes an optical scanner to realize a stable and favorable optical spot by correcting the wavefront aberration, where at least one surface of a lens included in a scanning imaging optical system is a vertical non-arc plane such that the shape in the horizontal scanning section is an arc or non-arc, and the shape in the vertical scanning section is non-arc, and the vertical non-arc plane is formed such that an incident angle of the principal ray in deflected beams entering into the respective lens surfaces of the lenses in the scanning imaging optical system, with respect to the normal on the lens surface, is 25 degrees or less in the whole area of the lens effective area.

However, the scanning lens using the conventional special toric surface, as described in (1), is a scanning lens in which the opposite surfaces are both anamorphic surfaces, and hence there are problems to be solved in that:

beam spot diameter thickening occurs due to decentering; and when the special toric surface is used for a surface having a large angle of inclination, machining accuracy deteriorates, thereby causing a defective image having thickened beam spot diameter due to a form error such as swells, or vertical lines.

In the scanning lens using the conventional special toric surface, as described in (1) and (2), the lens is thick, and even if the lens is a plastic molded article, the forming time and the cost of parts increase. Further, shading and ghost light have not been taken into consideration.

Further, in the scanning lens described in (1) and (2), a surface in which the radius of curvature in vertical scanning becomes asymmetric with respect to the horizontal scanning direction is adopted, but a rotationally symmetric aspheric surface is not used.

SUMMARY OF THE INVENTION

It is an object of the present invention to solve at least the problems in the conventional technology.

An optical scanner according to an aspect of the present invention includes a light source; an optical coupler that couples beams from the light source; an optical line image unit that forms a line image of the beams from the optical coupler, wherein the line image is longer in a horizontal scanning direction than in a vertical scanning direction; a deflector that deflection-scans the beams from the optical line image unit; and an optical scanning unit that includes scanning lenses that guide the beams from the deflector to a surface to be scanned, wherein a surface close to the deflector, of the scanning lens closest to a deflection reflecting surface, has a negative power in the vertical scanning direction, and is a special toric surface in which a radius of curvature in a vertical scanning changes from an optical axis of the lens surface toward a periphery of the horizontal scanning direction, and wherein an F number of the beams toward the surface to be scanned of the scanning lens in the vertical scanning direction is larger in a peripheral part than in a central part in an effective scanning width.

An optical scanner according to another aspect of the present invention includes a light source; an optical coupler that couples beams from the light source; an optical line image unit that forms a line image of the beams from the optical coupler, wherein the line image is longer in a horizontal scanning direction than in a vertical scanning direction; a deflector that deflection-scans the beams from the optical line image unit; and an optical scanning unit that includes a plurality of scanning lenses that guide the beams from the deflector to a surface to be scanned. In this structure, incident beams in a most peripheral part in an effective write width are inclined in a same direction in a deflection surface of revolution with respect to a normal on a surface of a scanning lens close to the deflector, a scanning lens closest to the deflector has a meniscus shape with a concave facing the deflector side in the horizontal scanning direction, a surface close to the deflector, of the scanning lens closest to the deflector, has a negative power in the vertical scanning direction, and is a special toric surface in which a radius of curvature in a vertical scanning changes from an optical axis of the lens surface toward a periphery of the horizontal scanning direction, and the surface close to the deflector of a scanning lens farthest from the deflector has a positive power in the vertical scanning direction.

An optical scanner according to still another aspect of the present invention includes a light source; an optical coupler that couples beams from the light source; an optical line image unit that forms a line image of the beams from the optical coupler, wherein the line image is longer in a horizontal scanning direction than in a vertical scanning direction; a deflector that deflection-scans the beams from the optical line image unit; and an optical scanning unit that includes a plurality of scanning lenses that guide the beams from the deflector to a surface to be scanned. In this structure, a scanning lens closest to the deflector has a meniscus shape with a concave facing the deflector side in the horizontal scanning direction, a surface close to the deflector, of the scanning lens closest to the deflector, has a negative power in the vertical scanning direction, and is a special toric surface in which a radius of curvature in a vertical scanning decreases from an optical axis of the lens surface toward a periphery of the horizontal scanning direction and increases bordering on an extreme value, and the surface close to the deflector, of a scanning lens farthest from the deflector, has a convex shape toward the deflector side in the horizontal scanning direction, and the scanning lens farthest from the deflector has a negative power in the horizontal scanning direction.

An optical scanner according to still another aspect of the present invention includes a light source; an optical coupler that couples beams from the light source; an optical line image unit that forms a line image of the beams from the optical coupler, wherein the line image is longer in a horizontal scanning direction than in a vertical scanning direction; a deflector that deflection-scans the beams from the optical line image unit; and an optical scanning unit that includes a plurality of scanning lenses that guide the beams from the deflector to a surface to be scanned. In this structure, at least one scanning lens has a rotationally symmetric aspheric surface and a special toric surface in which a radius of curvature in a vertical scanning changes from an optical axis of the lens surface toward a periphery of the horizontal scanning direction, and a surface having an area with a largest angle of inclination in an effective range with respect to a surface perpendicular to the optical axis, among the surfaces of all scanning lenses, is the rotationally symmetric aspheric surface.

An image forming apparatus according to still another aspect of the present invention forms an image on transfer paper by executing respective charging, exposure, development, and transfer processes. The image forming apparatus includes an exposing unit that executes the exposure process. The exposing unit includes a light source; an optical coupler that couples beams from the light source; an optical line image unit that forms a line image of the beams from the optical coupler, wherein the line image is longer in a horizontal scanning direction than in a vertical scanning direction; a deflector that deflection-scans the beams from the optical line image unit; and an optical scanning unit that includes scanning lenses that guide the beams from the deflector to a surface to be scanned. In this structure, a surface close to the deflector, of the scanning lens closest to a deflection reflecting surface, has a negative power in the vertical scanning direction, and is a special toric surface in which a radius of curvature in a vertical scanning changes from an optical axis of the lens surface toward a periphery of the horizontal scanning direction, and wherein an F number of the beams toward the surface to be scanned of the scanning lens in the vertical scanning direction is larger in a peripheral part than in a central part in an effective scanning width.

An image forming apparatus according to still another aspect of the present invention forms an image on transfer paper by executing respective charging, exposure, development, and transfer processes. The image forming apparatus includes an exposing unit that executes the exposure process. The exposing unit includes a light source; an optical coupler that couples beams from the light source; an optical line image unit that forms a line image of the beams from the optical coupler, wherein the line image is longer in a horizontal scanning direction than in a vertical scanning direction; a deflector that deflection-scans the beams from the optical line image unit; and an optical scanning unit that includes a plurality of scanning lenses that guide the beams from the deflector to a surface to be scanned. In this structure, the incident beams in a most peripheral part in an effective write width are inclined in a same direction in a deflection surface of revolution with respect to a normal on a surface of a scanning lens close to the deflector, a scanning lens closest to the deflector has a meniscus shape with a concave facing the deflector side in the horizontal scanning direction, a surface close to the deflector, of the scanning lens closest to the deflector, has a negative power in the vertical scanning direction, and is a special toric surface in which a radius of curvature in a vertical scanning changes from an optical axis of the lens surface toward a periphery of the horizontal scanning direction, and the surface to the deflector of a scanning lens farthest from the deflector has a positive power in the vertical scanning direction.

An image forming apparatus according to still another aspect of the present invention forms an image on transfer paper by executing respective charging, exposure, development, and transfer processes. The image forming apparatus includes an exposing unit that executes the exposure process. The exposing unit includes a light source; an optical coupler that couples beams from the light source; an optical line image unit that forms a line image of the beams from the optical coupler, wherein the line image is longer in a horizontal scanning direction than in a vertical scanning direction; a deflector that deflection-scans the beams from the optical line image unit; and an optical scanning unit that includes a plurality of scanning lenses that guide the beams from the deflector to a surface to be scanned. In this structure, a scanning lens closest to the deflector has a meniscus shape with a concave facing the deflector side in the horizontal scanning direction, a surface close to the deflector, of the scanning lens closest to the deflector, has a negative power in the vertical scanning direction, and is a special toric surface in which a radius of curvature in a vertical scanning decreases from an optical axis of the lens surface toward a periphery of the horizontal scanning direction and increases bordering on an extreme value, the surface close to the deflector, of a scanning lens farthest from the deflector, has a convex shape toward the deflector side in the horizontal scanning direction, and the scanning lens farthest from the deflector has a negative power in the horizontal scanning direction.

An image forming apparatus according to still another aspect of the present invention forms an image on transfer paper by executing respective charging, exposure, development, and transfer processes. The image forming apparatus includes an exposing unit that executes the exposure process. The exposing unit includes a light source; an optical coupler that couples beams from the light source; an optical line image unit that forms a line image of the beams from the optical coupler, wherein the line image is longer in a horizontal scanning direction than in a vertical scanning direction; a deflector that deflection-scans the beams from the optical line image unit; and an optical scanning unit that includes a plurality of scanning lenses that guide the beams from the deflector to a surface to be scanned. In this structure, at least one scanning lens has a rotationally symmetric aspheric surface and a special toric surface in which a radius of curvature in a vertical scanning changes from an optical axis of the lens surface toward a periphery of the horizontal scanning direction, and a surface having an area with a largest angle of inclination in an effective range with respect to a surface perpendicular to the optical axis, among the surfaces of all scanning lenses, is the rotationally symmetric aspheric surface.

The other objects, features, and advantages of the present invention are specifically set forth in or will become apparent from the following detailed description of the invention when read in conjunction with the accompanying drawings.

BRIEF DESCRIPTION OF THE DRAWINGS

FIGS. 10A and 10B illustrate optical arrangement for explaining a ghost reduction effect of the optical scanner in the first example, FIGS. 10A and 10B illustrating the optical arrangement in the horizontal and vertical scanning directions, respectively;

FIGS. 11A and 11B are aberration diagrams in a second example, FIG. 11A illustrating a curvature of field, and FIG. 11B illustrating velocity uniformity;

FIG. 16 is a schematic front elevation of an example of an image forming apparatus, to which the optical scanner according to the present invention can be applied.

DETAILED DESCRIPTION

Exemplary embodiments of an optical scanner and an image forming apparatus according to the present invention will be described below with reference to accompanying diagrams.

Figure 1:
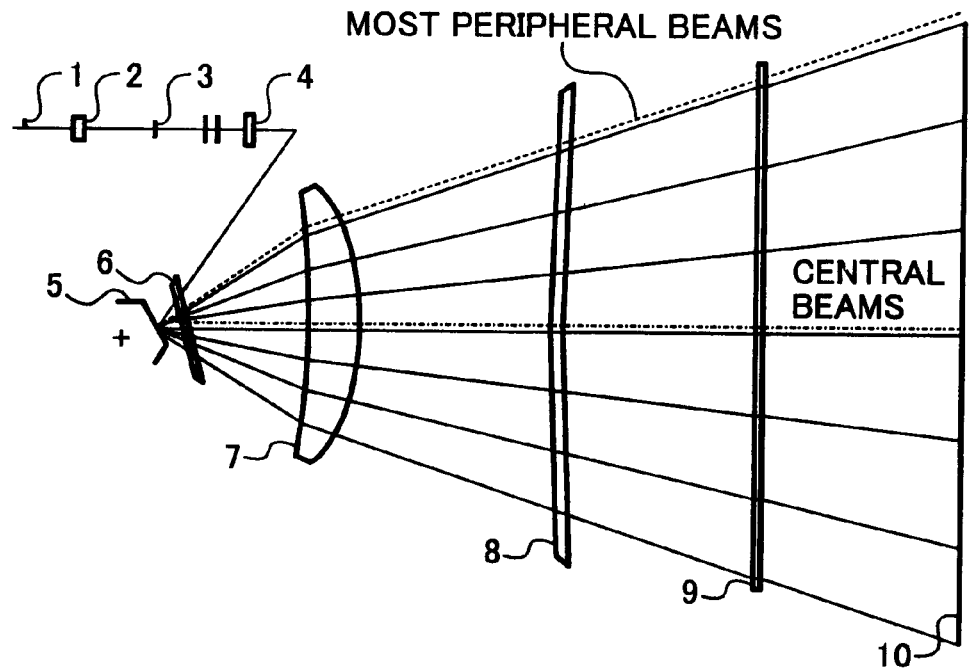
FIG. 1 illustrates an optical arrangement in an optical scanner according to a first embodiment, as seen from the horizontal scanning direction.

FIG. 1 illustrates an optical scanner according to a first embodiment. A light source 1 in the optical scanner includes a semiconductor laser, and for example, may be a multi-beam light source in which a plurality of light emitting sources are arranged at an equal interval. The beams emitted from the light source 1 are divergent beams, and are coupled into an optical system thereafter by a coupling lens 2 that constitutes an optical coupler of the present invention. The beams coupled by the coupling lens 2 may be weak divergent beams or weak convergent beams, or parallel beams. The beams are subjected to beam forming by an aperture 3, and the beams converge only in the vertical scanning direction by the action of a cylindrical lens 4. Therefore, a line image of the beams, longer in the horizontal scanning direction than in the vertical scanning direction, is formed at a position close to a deflection reflecting surface of a polygon mirror 5, being a deflector. The cylindrical lens 4 and the polygon mirror 5, used for forming the line image of the beams, constitute an optical line image unit of the present invention.

The polygon mirror 5 is rotated at a high constant velocity by a polygon motor, to deflection-scan the direction of the beams at an isometric velocity by each deflection reflecting surface. A scanning optical system is arranged on the course of the beams deflected at the isometric velocity. The scanning optical system constitutes an optical scanning unit of the present invention. Thus, the scanning optical system includes two scanning lenses 7 and 8. The scanning lenses 7 and 8 have a function of guiding the beams from the polygon mirror 5 to a surface 10 that is to be scanned, being the surface of the photoconductor, and imaging the beams on the surface 10 as a beam spot. Further, the scanning lenses 7 and 8 perform the well-known fθ function of scanning, at a constant velocity, the beams deflected by the polygon mirror 5 at the isometric velocity on the linear surface 10.

Here, the "horizontal scanning direction" corresponds to a plane formed by the beams to be deflection-scanned by the polygon mirror 5, and the "vertical scanning direction" is a direction orthogonal to the horizontal scanning direction. The optical scanner also includes a soundproof glass 6, and a dustproof glass 9. The polygon mirror 5 and the polygon motor are covered with a soundproof cover so that noise generated by the high-speed rotation does not leak to the outside, and the beams enter or go out through the soundproof glass 6 provided in this cover. The optical scanner is incorporated in one housing as one unit, is sealed so that dust and dirt do not enter the housing, and the deflected beams are emitted through the dustproof glass 9.

The optical scanner according to the first embodiment has a feature in the configuration of the scanning optical system. Therefore, the configuration of the scanning optical system will be explained specifically. It is assumed herein that the surface of the lens in the scanning optical system, on the side close to the polygon mirror 5, that is, the deflector is a first surface, and the surface on the side away from the deflector is a second surface.

The first surface of a scanning lens 7 closest to the deflection reflecting surface has a negative power in the vertical scanning direction, and is a special toric surface in which the radius of curvature in vertical scanning changes from the optical axis of the lens surface toward the periphery of the horizontal scanning direction. The first surface of the scanning lens 7 has the negative power, to reduce the absolute value of the lateral magnification in the vertical scanning direction between the deflection reflecting surface and the surface 10. By reducing the absolute value of the lateral magnification in the vertical scanning direction, variations in the beam waist position in the vertical scanning direction due to an installation error or a shape error of the optical parts reduce.

Figure 3:
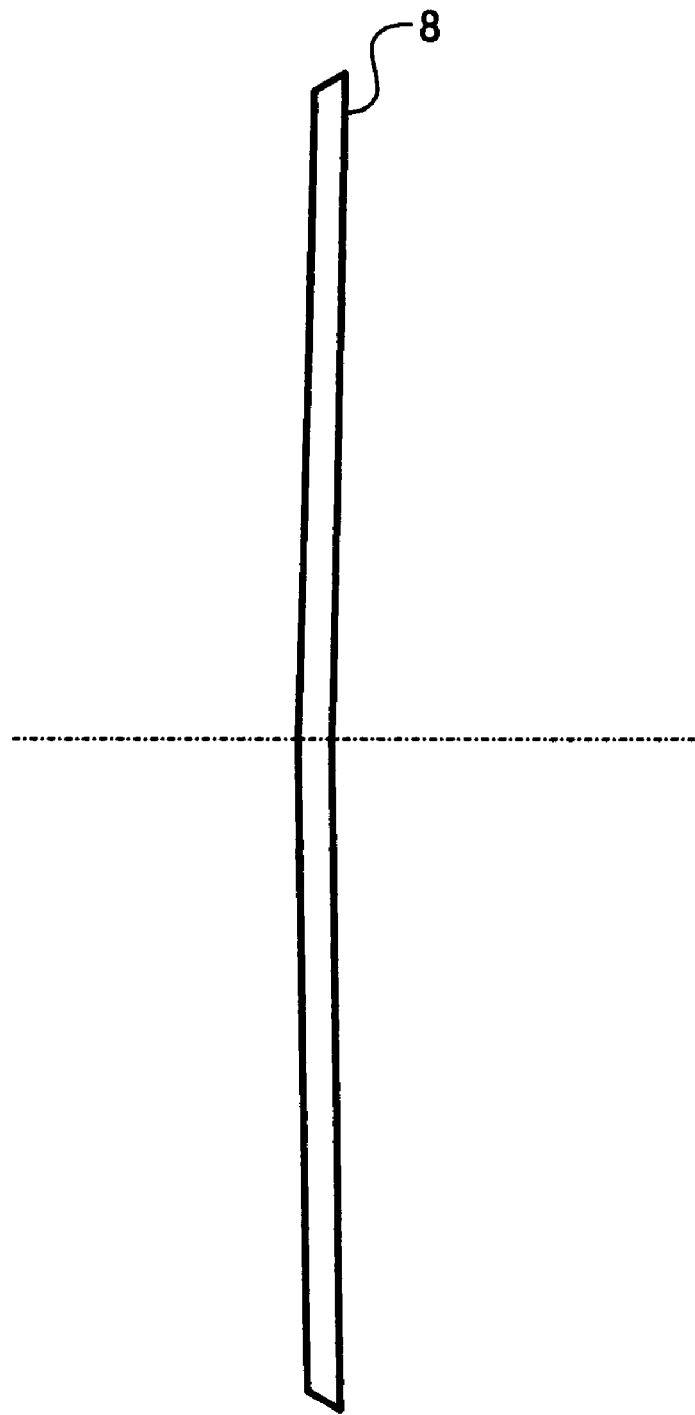
FIG. 3 is an enlarged plan view of a scanning lens that is placed farthest from a deflector in the optical scanner.

In the optical scanner according to the first embodiment, a second scanning lens 8, that is, the scanning lens away from the deflector is uniformly thin (see FIG. 3), and it is normally difficult to correct the wavefront aberration in the scanning optical system that includes the second scanning lens 8 of such a shape. When it is tried to correct the wavefront aberration, the vertical scanning curvature of the first surface of the first scanning lens 7 increases from the center toward the circumference. At this time, however, if the F number in the vertical scanning direction on the surface 10 is made constant by the image height, the second scanning lens 8 has a shape largely curved in a convex shape toward the deflector side within the deflection surface of revolution. This ensures the characteristic at the medium value in design, but the beam spot diameter thickening due to decentering increases, and the optical scanning performance deteriorates as a whole.

The F number is defined as the ratio of the focal length f of the lens to the effective diameter D of the lens and the value of the F number is obtained as F=f/D.

Therefore, in this embodiment, the scanning optical system is constructed such that the F number in the vertical scanning direction of the beams directed to the surface 10 increases in the most peripheral part in the effective scanning width than in the central part thereof, at such a level that a beam spot diameter deviation in the vertical scanning direction due to an image height or a beam pitch deviation due to the image height, when the light source is a multi-beam light source, does not cause a problem. As a result, the optical scanner, in which the wavefront aberration at the medium value can be reduced, and which has a large tolerance for decentering, can be provided.

Figure 2A:
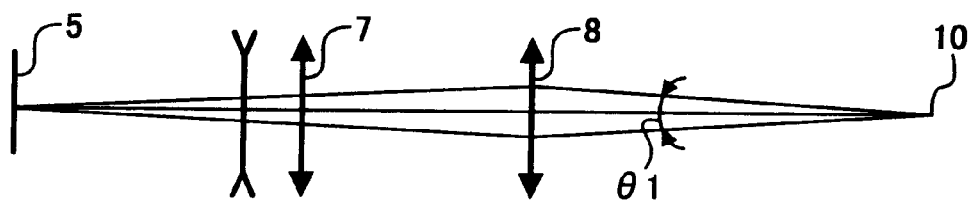
FIGS. 2A and 2B illustrate changes in the vertical scanning section of beams, FIG. 2A illustrating beams in the central part, and FIG. 2B illustrating beams in the most peripheral part.
Figure 2B:
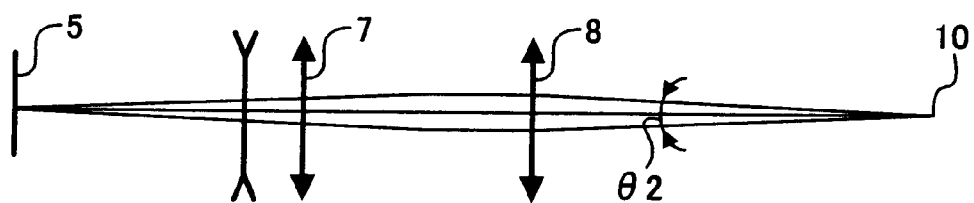

The F number in the vertical scanning direction will be explained further. To reduce the absolute value of the lateral magnification in the vertical scanning direction and correct the wavefront aberration, it is necessary to make the power in the vertical scanning direction of the first surface of the scanning lens 7 on the deflector side negative, and to increase the power, that is, increase the curvature from the central part toward the peripheral part in the horizontal scanning direction, to reduce the negative power. In FIG. 1, the beams indicated by a one-dot chain line denote the beams in the central part, and the beams indicated by a dotted line denote the beams in the most peripheral part. FIGS. 2A and 2B illustrate changes in the vertical scanning section of beams from the deflection reflecting surface to the surface 10, FIG. 2A illustrating the beams in the central part, and FIG. 2B illustrating the beams in the most peripheral part. The power in the vertical scanning direction of the first surface of the scanning lens 7 is larger in the peripheral part than in the central part. Therefore, if it is assumed that the convergent angle in the central part of the beams converging in a spot form on the surface 10 is θ1, and the convergent angle in the most peripheral part is θ2, then θ1 is larger than θ2. Therefore, the F number in the vertical scanning direction on the surface 10 is larger in the most peripheral part than in the central part. In other words, the wavefront aberration can be favorably corrected by setting the F number in the vertical scanning direction on the surface 10 to the relation described above.

In the first embodiment, it is desired that the surface away from the deflector (second surface) of the scanning lens 7 closest to the deflection reflecting surface be a rotationally symmetric aspheric surface centering on the optical axis. The rotationally symmetric aspheric surface has an advantage in that it can be formed relatively easily.

All surfaces of the scanning lens may be the special toric surface in which the radius of curvature in vertical scanning changes from the optical axis of the lens surface toward the periphery of the horizontal scanning direction.

Generally, the surface away from the deflection reflecting surface, of the scanning lens closest to the deflector, has a large angle of inclination (the angle of inclination of the lens surface with respect to the surface perpendicular to the optical axis). Consequently, the problem in machining increases. Thus, in view of the optical characteristic and machining, the rotationally symmetric aspheric surface is effective. If one surface is the rotationally symmetric aspheric surface, there is an advantage in that the beam spot diameter thickening due to the relative deviation between surfaces reduces.

The optical scanner according to a second embodiment will be explained next. In the second embodiment, the arrangement of the optical elements from the light source 1 to the surface 10 is substantially the same as that in the first embodiment. Therefore, the optical scanner of the second embodiment will be explained with reference to FIG. 1. Also in this embodiment, there is a feature in the configuration of the scanning optical system, and hence the configuration of the scanning optical system will be mainly explained. The scanning optical system includes a plurality of scanning lenses 7 and 8. The incident beams in the most peripheral part in the effective write width is inclined in the same direction in the deflection surface of revolution, with respect to the normal on the first surface of the scanning lens 7. The scanning lens 7 that is closest to the deflector has a meniscus shape with the concave facing the deflector side in the horizontal scanning direction. The first surface of the scanning lens 7 has a negative power in the vertical scanning direction, and is the special toric surface in which the vertical scanning curvature changes from the optical axis of the lens surface toward the periphery of the horizontal scanning direction. The first surface of the scanning lens 8 that is farthest from the deflector has a positive power in the vertical scanning direction.

Since the first scanning lens 7 has the meniscus shape, with the concave facing the polygon mirror 5 in the horizontal scanning direction, the scanning lens can be made thin, and the angle between the beams incident on the surface of the scanning lens 7 and the normal on the lens surface can be decreased. Consequently, the wavefront aberration can be corrected. Making the power in the vertical scanning direction of the first surface of the first scanning lens 7 negative, reduces the absolute value of the lateral magnification in the vertical scanning direction of the scanning optical system, and enlarges the tolerance for an installation error or a part error of the optical elements. Moreover, using the special toric surface in which the radius of curvature in vertical scanning changes from the optical axis toward the periphery of the horizontal scanning direction, reduces both the wavefront aberration and a difference in the F number in the vertical scanning direction on the surface to be scanned. Consequently, the deviation of the vertical scanning beam spot diameter due to the image height reduces. Further, a beam pitch deviation between image heights at the time of using multi-beams reduces.

Figure 9A:
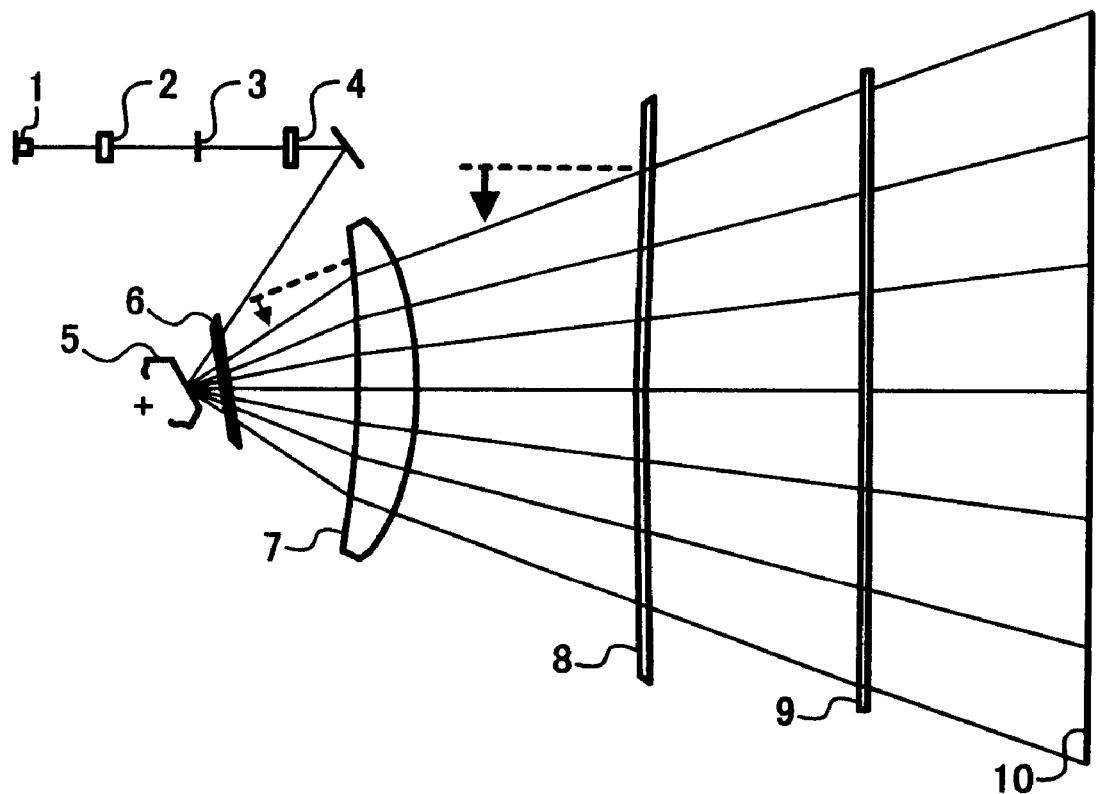
FIGS. 9A and 9B illustrate an optical arrangement for explaining a wavefront aberration reduction effect in the first example, FIG. 9A illustrating the optical system arrangement in the horizontal scanning direction, and FIG. 9B illustrating the optical system arrangement in the vertical scanning direction.
Figure 9B:
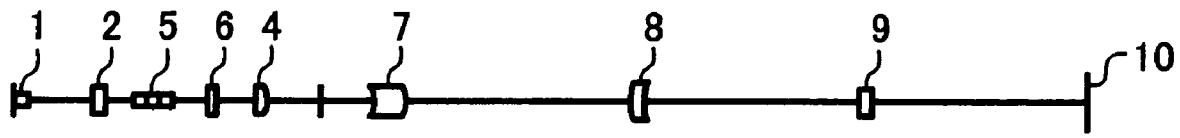

However, if the power in the vertical scanning direction on the first surface of the first scanning lens 7 closest to the deflector is negative, even if the special toric surface is used, the wavefront aberration remains. Therefore, as shown in FIGS. 9A and 9B, the scanning optical system is constructed such that the beams in the most peripheral part in the scanning optical system are inclined in the same direction with respect to the normal on the first surface of the first scanning lens 7 and on the first surface of the second scanning lens 8. Consequently, the tolerance for decentering of the first scanning lens 7 and the second scanning lens 8 increases.

Japanese Patent Application Laid-Open No. 2001-21824 discloses a method of decreasing the angle between the incident beams and the scanning lens. However, in this method, it is necessary to largely curve the scanning lens within the deflection surface of revolution. Consequently, the workability of the scanning lens decreases, and the tolerance for decentering considerably decreases. Therefore, in the second embodiment, the power in the vertical scanning direction on the first surface of the second scanning lens 8 is made positive, so that the wavefront aberration occurring on the first surface of the first scanning lens 7 is compensated by the first surface of the second scanning lens 8.

If the first scanning lens 7 has a meniscus shape with the concave directed toward the polygon mirror in the horizontal scanning direction, as shown by two-dot chain line in FIG. 10, then there is the possibility that the ghost light reflected from the first surface of the second scanning lens 8 is reflected again onto the first or the second surface of the first scanning lens 7, and as shown by arrow of the dotted line, the reflected light reaches the surface 10, thereby causing the ghost light. Further, there is the possibility that the ghost lights on the first surface and the second surface of the first scanning lens 7 combine and increase the intensity of the ghost light on the surface 10. However, if the power in the vertical scanning direction on the first surface of the second scanning lens 8 is made positive, in other words, if the first surface of the second scanning lens 8 is a convex plane toward the deflector (as shown by a solid line in FIG. 10), the ghost light reflected by the first surface of the second scanning lens 8 diverges to such a level that causes no problem. The beams reflected by the first scanning lens 7 and returning to the polygon mirror change the direction largely. Hence, generally, there is no problem.

The optical scanner according to a third embodiment will be explained next. In this embodiment, the appearance is the same as those shown in FIGS. 1, 9A and 9B. The scanning optical system includes a plurality of scanning lenses 7 and 8. The first scanning lens 7 closest to the deflector has a meniscus shape, which is concave toward the deflector side in the horizontal scanning direction. The first surface of the scanning lens 7 that is closest to the deflector has a negative power in the vertical scanning direction, and is the special toric surface in which the radius of curvature in the vertical scanning decreases from the optical axis of the lens surface toward the periphery of the horizontal scanning direction, and increases bordering on an extreme value. The first surface of the second scanning lens 8 farthest from the deflector has a convex shape toward the deflector side in the horizontal scanning direction, and the second scanning lens 8 farthest from the deflector has a negative power in the horizontal scanning direction.

As in the second embodiment, the first surface of the first scanning lens 7 is the special toric surface, and has a negative power in order to reduce the absolute value of the lateral magnification in the vertical scanning direction between the deflection reflecting surface and the surface 10. Reducing the absolute value of the lateral magnification in the vertical scanning direction reduces the variations in the beam waist position in the vertical scanning direction due to an installation error or a shape error of the optical parts. The scanning lens in the third embodiment, more specifically, the second scanning lens 8, is uniformly thin, and it is normally difficult to correct the wavefront aberration. To correct the wavefront aberration, the radius of curvature in vertical scanning on the first surface of the first scanning lens 7 is increased from the center toward the peripheral part. Making the second scanning lens 8 convex toward the deflector side in the horizontal scanning direction, makes the F number in the vertical scanning direction on the surface 10 constant due to the image height.

If the first scanning lens 7 has the meniscus shape, with the concave facing the polygon mirror in the horizontal scanning direction as described above, the ghost light reflected on the first surface of the second scanning lens 8 is again reflected on the first or the second surface of the first scanning lens 7 to reach the surface 10 again, thereby causing the ghost light. Further, there is the possibility that the ghost lights on the first and the second surfaces of the first scanning lens 7 combine and increase the intensity of the ghost light on the surface 10. However, in the third embodiment, the first surface of the second scanning lens 8 is made convex toward the deflector side in the horizontal scanning direction. Therefore, the ghost light returning to the first scanning lens 7 reduces, and hence, the image quality does not degrade. Similar to the above embodiments, if the power of the first surface of the second scanning lens 8 in the vertical scanning direction is made positive, the effect further increases.

If the second scanning lens 8 has a concave shape toward the deflector, as shown by chain line in FIG. 10A, the ghost light is likely to occur. However, if the image forming apparatus has a configuration as in the third embodiment, the ghost light occurs rarely.

In order to make the second scanning lens 8 thin, it is desired that the power on the optical axis in the horizontal scanning direction is negative, and the thickness thereof increases from the center toward the peripheral part, and decreases toward the peripheral part, bordering on the extreme value. By making the power of the second scanning lens 8 in the horizontal scanning direction negative, variations in the curvature of field in the horizontal scanning direction due to temperature reduce, and a stable beam spot diameter can be obtained.

The optical scanner according to a fourth embodiment will be explained below. In this embodiment, the appearance is the same as those shown in FIGS. 1, 9A, and 9B, and has a feature in the configuration of the scanning optical system. Therefore, the configuration of the scanning optical system will be specifically explained.

In the optical scanner according to the fourth embodiment, the scanning optical system includes a plurality of scanning lenses 7 and 8, and satisfies the conditions given below:

at least one scanning lens has a rotationally symmetric aspheric surface, and a special toric surface in which the radius of curvature in vertical scanning changes from the optical axis of the lens surface toward the periphery of the horizontal scanning direction; and the surface having an area with the largest angle of inclination in the effective range with respect to the surface perpendicular to the optical axis, among the surfaces of all scanning lenses, is the rotationally symmetric aspheric surface.

More specifically, in the first scanning lens 7 closest to the deflection reflecting surface in the scanning optical system, the first surface is the special toric surface in which the radius of curvature in vertical scanning changes from the optical axis of the lens surface toward the periphery of the horizontal scanning direction, and the second surface is the rotationally symmetric aspheric surface. The rotationally symmetric aspheric surface here is symmetric about the optical axis of the lens as the axis of symmetry.

Thus, using the special toric surface for the first surface of the first scanning lens 7, reduces the wavefront aberration in the design, and reduces a difference in the F number in the vertical scanning direction on the surface 10 due to the image height, reduces a deviation in the beam spot diameter in the vertical scanning due to the image height, and also reduces a beam pitch deviation between image heights if multi-beams are used. Among all the scanning lenses, the surface having the largest angle of inclination with respect to the optical axis is the second surface of the first scanning lens 7. Using the rotationally symmetric aspheric surface for this surface, beam spot diameter thickening due to relative deviation between respective surfaces reduces, thereby realizing stabilization of the beam spot diameter. The scanning lens is machined by cutting or forming using plastic or the like, and the forming die is machined by cutting. Therefore, if the surface of the lens is the rotationally symmetric aspheric surface, the working time reduces, and working accuracy improves, thereby improving the quality.

The optical scanner according to a fifth embodiment will be explained next.

In the optical scanner according to the fifth embodiment, in addition to the above configuration, the surfaces of all scanning lenses 7 and 8 in the scanning optical system are formed of the rotationally symmetric aspheric surface or the special toric surface.

The rotationally symmetric aspheric surface is a surface having large tolerance for decentering and excellent workability, and the special toric surface is a surface excellent in aberration correction in the design. There are a cylindrical lens surface, a general toric surface, and the like, but none of those surfaces have large tolerance for decentering, and do not have the capacity for aberration correction on the design as large as the special toric surface. Therefore, by forming all surfaces of the scanning lenses 7 and 8 in the scanning optical system into the special toric surface and the rotationally symmetric aspheric surface, an optical scanner that is excellent in workability and that has a large tolerance for decentering and excellent optical characteristics, can be provided.

Both surfaces of the second scanning lens 8 here are the special toric surface, to reduce the wavefront aberration on the design, and to reduce a difference in the F number in the vertical scanning direction on the surface 10 due to the image height.

The optical scanner according to a sixth embodiment will be explained next.

In the optical scanner according to the sixth embodiment, in addition to the configuration above, the surface having the largest effective width in the horizontal scanning direction, among the surfaces of the scanning lenses 7 and 8 in the scanning optical system, is the special toric surface.

The surface having the largest effective width in the horizontal scanning direction, of the surfaces of the scanning lenses 7 and 8, is the second surface of the second scanning lens 8. Using the special toric surface for this surface, the curvature of field in the vertical scanning direction can be finely corrected.

The optical scanner according to a seventh embodiment will be explained next.

In the optical scanner according to the seventh embodiment, in addition to the configuration above, all scanning lenses 7 and 8 in the scanning optical system have an angle of inclination on the lens surface of 30 degrees or less in the effective range with respect to the surface perpendicular to the optical axis. The scanning lenses 7 and 8 have the special toric surface in which the radius of curvature in vertical scanning changes according to the lens height in the horizontal scanning direction. In the special toric surface, a variation in the vertical scanning curvature per 1 millimeter (mm) of the lens height in the horizontal scanning direction is smaller than $1.5 \times 10^{-4}$ (1/mm).

The working method of the scanning lens here is largely divided into cutting and forming, but the forming die is manufactured by cutting. The angle of inclination on the lens surface in the effective range largely relates to the accuracy of cutting, and it is necessary to make the angle of inclination of all scanning lenses 7 and 8 equal to or less than 30 degrees, to reduce swells. In the present invention, a special surface in which the vertical scanning curvature changes according to the lens height in the horizontal scanning direction is used, and it is necessary that the change in the lens height in the horizontal scanning direction be as small as possible. Therefore, to make the wavefront aberration favorable, and to obtain a stable beam spot diameter, it is necessary that the variation in the vertical scanning curvature per 1 mm of the lens height in the horizontal scanning direction be smaller than $1.5 \times 10^{-4}$ (1/mm) in the special toric surface. If the variation in the vertical scanning curvature per 1 mm of the lens height in the horizontal scanning direction is large, deterioration in the beam spot diameter due to the installation error of the lens increases. The present invention is effective in this regard.

The optical scanner according to an eighth embodiment will be explained next.

In the optical scanner according to the eighth embodiment, in addition to the configuration above, the scanning optical system includes two scanning lenses 7 and 8, and satisfies the conditions given below:

the beams in the most peripheral part in the effective write width are inclined in the same direction in the deflection reflecting surface, with respect to the normal on the first surfaces of the two scanning lenses 7 and 8;

the first scanning lens 7 closest to the polygon mirror 5 has a meniscus shape, with the concave facing the deflector side in the horizontal scanning direction;

the first surface of the first scanning lens 7 closest to the polygon mirror 5 has a negative power in the vertical scanning direction, and is formed of the special toric surface in which the vertical scanning curvature changes from the optical axis of the lens surface toward the periphery of the horizontal scanning direction; and the first surface of the second scanning lens 8 farthest from the polygon mirror 5 has a positive power in the vertical scanning direction.

The first scanning lens 7 here has the meniscus shape, with the concave facing the polygon mirror 5 in the horizontal scanning direction. Therefore, the first scanning lens 7 can be made thin, and the angle between the beams incident on the surface of the first scanning lens 7 and the normal on the lens surface can be reduced, thereby enabling correction of the wavefront aberration. Further, by making the power in the vertical scanning direction on the first surface of the first scanning lens 7 negative, the absolute value of the lateral magnification in the vertical scanning direction of the scanning optical system can be reduced, thereby enlarging the tolerance for an installation error and parts error of the optical elements. Using the special toric surface in which the radius of curvature in the vertical scanning decreases from the optical axis toward the peripheral part of the horizontal scanning direction, and increases bordering on the extreme value, the wavefront aberration and a difference in the F number in the vertical scanning direction on the surface can be reduced, a deviation in the beam spot diameter in the vertical scanning due to the image height can be reduced, and a beam pitch deviation between image heights at the time of using the multi-beams can be reduced.

However, if the power in the vertical scanning direction of the first surface of the first scanning lens 7 is negative, even when the special toric surface is used, the wavefront aberration remains. Therefore, as shown in FIGS. 9A and 9B, the scanning optical system is constructed such that the beams in the most peripheral part in the scanning optical system are inclined in the same direction with respect to the normal on the first surface of the first scanning lens 7 and on the first surface of the second scanning lens 8. Consequently, the tolerance for decentering of the first scanning lens 7 and the second scanning lens 8 increases. As described in Japanese Patent Application Laid-Open No. 2001-21824, there is a method of decreasing the angle between the incident beams and the scanning lens. However, in this case, since it is necessary to largely curve the scanning lens in the deflection surface of revolution, not only does the workability of the scanning lens decrease, but also the tolerance for decentering considerably decreases. In the above configuration, therefore, the power in the vertical scanning direction on the first surface of the second scanning lens 8 is made positive, so that the wavefront aberration occurring on the first surface of the first scanning lens 7 is compensated by the first surface of the second scanning lens 8.

As shown by one-dot chain line in FIG. 10A, if the second scanning lens 8 has a meniscus shape, with the concave directed toward the polygon mirror in the horizontal scanning direction, there is the possibility that the ghost light reflected on the first surface of the second scanning lens 8 is again reflected on the first or the second surface of the first scanning lens 7, as shown by arrow of dotted line, the reflected light reaches the surface 10, thereby causing the ghost light. Further, there is the possibility that the ghost lights on the first surface, and those on the second surface of the first scanning lens 7 are combined, to increase the intensity of the ghost light on the surface 10. However, as shown by solid line in FIGS. 10A and 10B, if the power in the vertical scanning direction on the first surface of the second scanning lens 8 is made positive, in other words, if the first surface of the second scanning lens 8 is a convex plane toward the deflector, the ghost light reflected by the first surface of the second scanning lens 8 diverges to such a level that causes no problem. The beams reflected by the first scanning lens 7 and returning to the polygon mirror change the direction largely, and hence, generally there is no problem.

The optical scanner explained in the first to the eighth embodiments can be applied as an exposure unit or a write unit in an image forming apparatus such as a printer or a copier. FIG. 16 is a schematic front elevation of an example of an image forming apparatus to which the optical scanner according to the present invention is applied as an exposure unit. The exposure unit constitutes an exposing unit of the present invention. In FIG. 16, a charging unit 112, an exposure unit 117, a developing unit 113, a transfer unit 114, and a cleaning unit 115 are arranged in this order in the direction of rotation of a photosensitive drum 111 in an image forming apparatus 100, to execute an electrophotographic process of charging, exposure, development, transfer, and cleaning. The exposure unit 117 includes the optical scanner, and emits laser beams LB for deflection scanning toward the surface of the photosensitive drum 111, so that the laser beam spot scans the surface of the photosensitive drum 111.

The surface of the photosensitive drum 111 is uniformly charged beforehand by the charging unit 112, and by scanning the surface by the beam spot modulated according to an image signal, an electrostatic latent image is formed on the surface of the photosensitive drum 111. The developing unit 113 supplies a toner to visualize the electrostatic latent image as a toner image. The transfer unit 114 transfers the toner image onto transfer material (transfer paper, or various kinds of sheet) P supplied one by one from a paper feed cassette 118 by a paper feed roller 120, with the timing adjusted by a resist roller 119. The surface of the photosensitive drum 111 after the transfer is discharged and cleaned by the cleaning unit 115, and charged again. On the other hand, the transfer paper P onto which the toner image has been transferred is heated and fixed by a fixing unit 116, and discharged to a catch tray 123, through a discharge path 121 and discharge rollers 122.

In the image forming apparatus having such a configuration, by including the optical scanner having the configuration described above as the means for executing the exposure process, the wavefront aberration can be made favorable, a stable beam spot diameter can be obtained, deterioration in the beam spot diameter due to decentering can be reduced, and the ghost light can be removed. As a result, the beam spot having a small diameter can be realized, thereby enabling image formation that has excellent granularity and gradient.

In FIG. 16, an image forming apparatus that forms a monochrome image is shown. However, an image forming apparatus that forms multi-color or full-color images can be obtained by having a configuration such that a plurality of imaging units including the photosensitive drum 111, and the various units around the photosensitive drum 111, that is, the charging unit, the exposure unit, the developing unit, the transfer unit, and the cleaning unit, are arranged in parallel in the transportation direction of the transfer material (in a tandem configuration). When the configuration is such that developing units of a plurality of colors and an intermediate transfer body are provided with respect to one photosensitive drum, one drum and intermediate transfer type color image forming apparatus can be obtained. Using the optical scanner of the present invention in the color image forming apparatus, color image formation that has excellent granularity and gradient can be performed.

A first example of the optical scanner is explained next, as a specific example.

The specification from the light source to the polygon mirror 5 as the deflector is as follows:

Wavelength of light source 1: 655 nanometer (nm)

Focal length of coupling lens 2: 27 mm

Coupling action: collimating action

Polygon mirror 5:

Number of deflection reflecting surfaces: 5

Inscribed circle radius: 18 mm

Angle between incident angle of beams from light source side and optical axis of scanning optical system: 58 degrees.

The lens data after deflection is as follows.

The first surface of the first scanning lens 7 and both surfaces of the second scanning lens 8 are expressed by the equations (1) and (2) as explained below.

Horizontal Scanning Noncircular Equation:

The surface in the horizontal scanning surface is of noncircular shape. Assuming that the paraxial radius of curvature in the horizontal scanning surface on the optical axis is Rm, the distance in the horizontal scanning direction from the optical axis is Y, the conical constant is K, and higher-order coefficients are A1, A2, A3, A4, A5, A6, . . . , the depth in the direction of the optical axis X is expressed by the following polynomial (1).

$$X = (Y^2/Rm)/\left[1 + \sqrt{\{1-(1+K)(Y/Rm)^2\}}\right] + A1 \cdot Y + A2 \cdot Y^2 + A3 \cdot Y^3 + A4 \cdot Y^4 + A5 \cdot Y^5 + A6 \cdot Y^6 + \ldots \quad (1)$$

Here, if a numerical value other than zero is substituted for odd-order coefficients A1, A3, A5, . . . , then the depth has an asymmetric shape in the horizontal scanning direction.

In the first example, only even-orders are used, giving a system that is symmetric in the horizontal scanning direction. Similarly, in a second example described later, only even-orders are used, giving a system symmetric in the horizontal scanning direction.

Vertical Scanning Curvature Equation:

An equation (2) in which the vertical scanning curvature changes corresponding to the horizontal scanning direction is shown below.

$$Cs(Y)=1/Rs(0)+B1 \cdot Y+B2 \cdot Y^2+B3 \cdot Y^3+B4 Y^4+B5 \cdot Y^5+ \ldots \quad (2)$$

Here, if a numerical value other than zero is substituted for odd-order coefficients B1, B3, B5, . . . , the radius of curvature in vertical scanning becomes asymmetric in the horizontal scanning direction.

The second surface of the first scanning lens 7 is a rotationally symmetric aspheric surface, and expressed by the following equation (3).

Rotationally Symmetric Aspheric Surface:

Assuming that the paraxial radius of curvature on the optical axis is R, the distance in the horizontal scanning direction from the optical axis is Y, the conical constant is K, and higher-order coefficients are A1, A2, A3, A4, A5, A6, . . . , the depth in the direction of the optical axis X is expressed by the following polynomial (3).

$$X = (Y^2/R)/\left[1 + \sqrt{\{1-(1+K)(Y/Rm)^2\}}\right] + A1 \cdot Y + A2 \cdot Y^2 + A3 \cdot Y^3 + A4 \cdot Y^4 + A5 \cdot Y^5 + A6 \cdot Y^6 + \ldots \quad (3)$$

Specific numerical data is shown below. In the numerical data below, [×10$^{+1}$] is expressed as [E+01], and [×10$^{-7}$] is expressed as [E−07], and the same thing applies hereafter.

Shape of First Surface of First Scanning Lens 7:
  Rm=−279.9, Rs=−61.0
  K=−2.900000E+01
  A4=1.755765E−07
  A6=−5.491789E−11
  A8=1.087700E−14
  A10=−3.183245E−19
  A12=−2.635276E−24
  B1=−2.066347E−06
  B2=5.727737E−06
  B3=3.152201E−08
  B4=2.280241E−09
  B5=−3.729852E−11
  B6=−3.283274E−12
  B7=1.765590E−14
  B8=1.372995E−15
  B9=−2.889722E−18
  B10=−1.984531E−19

Shape of second surface of first scanning lens 7:
  R=−83.6
  K=−0.549157
  A4=2.748446E−07
  A6=−4.502346E−12
  A8=−7.366455E−15
  A10=1.803003E−18
  A12=2.727900E−23

Shape of first surface of second scanning lens 8:
  Rm=6950, Rs=110.9
  K=0.000000E+00
  A4=1.549648E−08
  A6=1.292741E−14
  A8=−8.811446E−18
  A10=−9.182312E−22
  B1=−9.593510E−07
  B2=−2.135322E−07
  B3=−8.079549E−12
  B4=2.390609E−12
  B5=2.881396E−14
  B6=3.693775E−15
  B7=−3.258754E−18
  B8=1.814487E−20
  B9=8.722085E−23
  B10=−1.340807E−23

Shape of second surface of second scanning lens 8:
  Rm=766, Rs=−68.22
  K=0.000000E+00
  A4=−1.150396E−07
  A6=1.096926E−11
  A8=−6.542135E−16
  A10=1.984381E−20
  A12=−2.411512E−25
  B2=3.644079E−07
  B4=−4.847051E−13
  B6=−1.666159E−16
  B8=4.534859E−19
  B10=−2.819319E−23

The refractive index of the scanning lens in the used wavelength is 1.52724 in all lenses.

Specific numerical values in the optical arrangement are as follows:

Distance d1 from deflected surface to first surface of first scanning lens: 64 mm;
Thickness d2 at the center of first scanning lens 7: 22.6 mm;
Distance d3 from second surface of first scanning lens to first surface of second scanning lens: 75.9 mm;
Thickness d4 at the center of second scanning lens: 4.9 mm;
Distance d5 from second surface of second scanning lens to surface to be scanned: 158.7 mm.

The soundproof glass 6 and the dustproof glass 9 having a refractive index of 1.514 and a thickness of 1.9 mm are arranged as shown in FIGS. 9A and 9B, and the soundproof glass 6 is inclined by 10 degrees with respect to a direction parallel to the horizontal scanning direction in the deflection surface of revolution.

The F numbers in the vertical scanning direction at the image height in the most peripheral part and the central part of the scanning optical system are given below:

Image height 150 mm: 41.5,
Image height 0 mm: 40.4,
Image height −150 mm: 41.0.

Figure 4A:
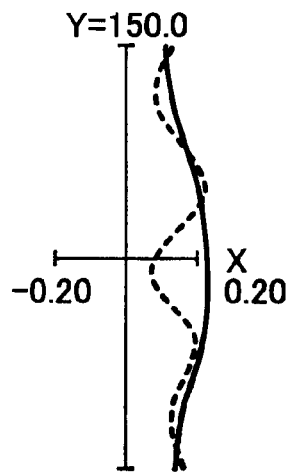
FIGS. 4A and 4B are aberration diagrams in a first example, FIG. 4A illustrating a curvature of field, and FIG. 4B illustrating velocity uniformity.
Figure 4B:
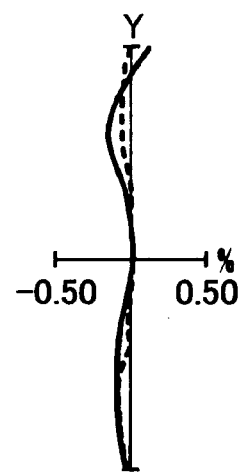

FIGS. 4A and 4B are aberration diagrams of the first example as described above. FIG. 4A illustrates the curvature of field, where X-axis indicates defocusing (mm), and Y-axis indicates image height (mm). The solid line indicates the curvature of field in the vertical scanning direction, and the dotted line indicates the curvature of field in the horizontal scanning direction. FIG. 4B illustrates the velocity uniformity, where X-axis indicates percentage, and Y-axis indicates image height (mm). The solid line indicates linearity, and the dotted line indicates fθ characteristic.

Figure 5:
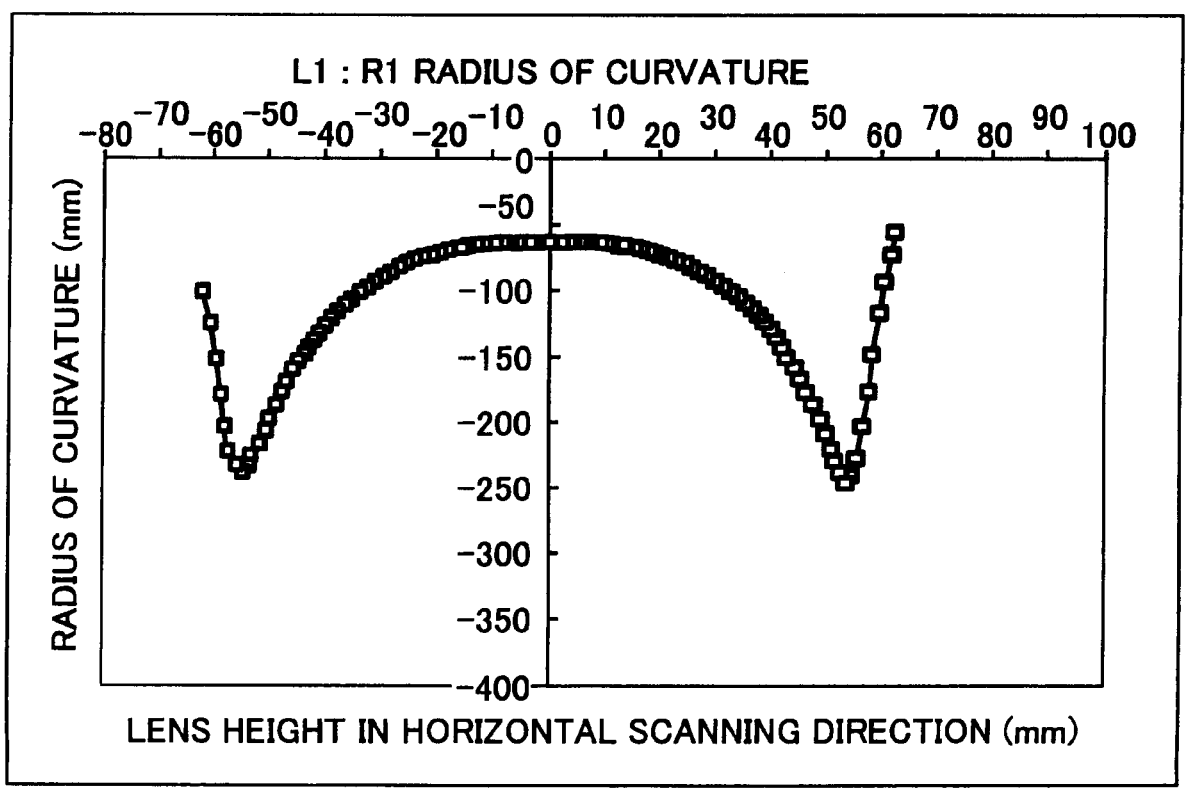
FIG. 5 is a graph of changes in the radius of curvature with respect to the lens height in the horizontal scanning direction, on the surface on the deflector side of the scanning lens closest to the deflector in the first example.

FIG. 5 is a graph of changes in the radius of curvature in the vertical scanning direction with respect to the lens height in the horizontal scanning direction, on the first surface (R1) of the first scanning lens (L1) 7.

Figure 6:
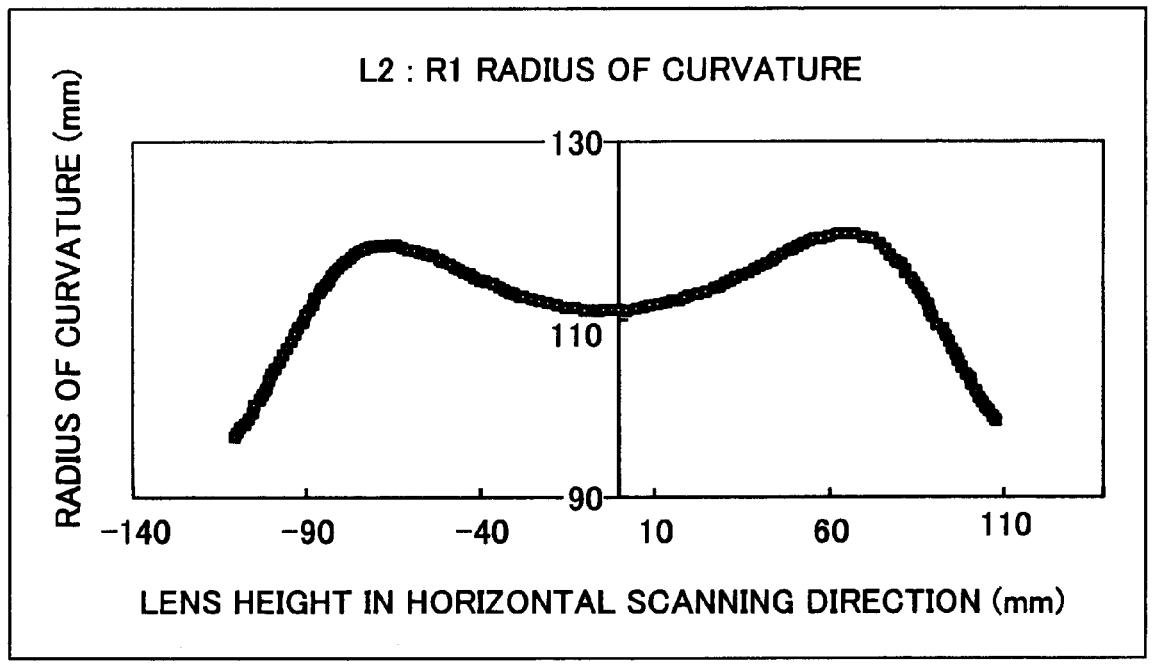
FIG. 6 is a graph of changes in the radius of curvature with respect to the lens height in the horizontal scanning direction, on the surface on the deflector side of the scanning lens farthest from the deflector in the first example.

FIG. 6 is a graph of changes in the radius of curvature in the vertical scanning direction with respect to the lens height in the horizontal scanning direction, on the first surface (R1) of the second scanning lens (L2) 8.

Figure 7:
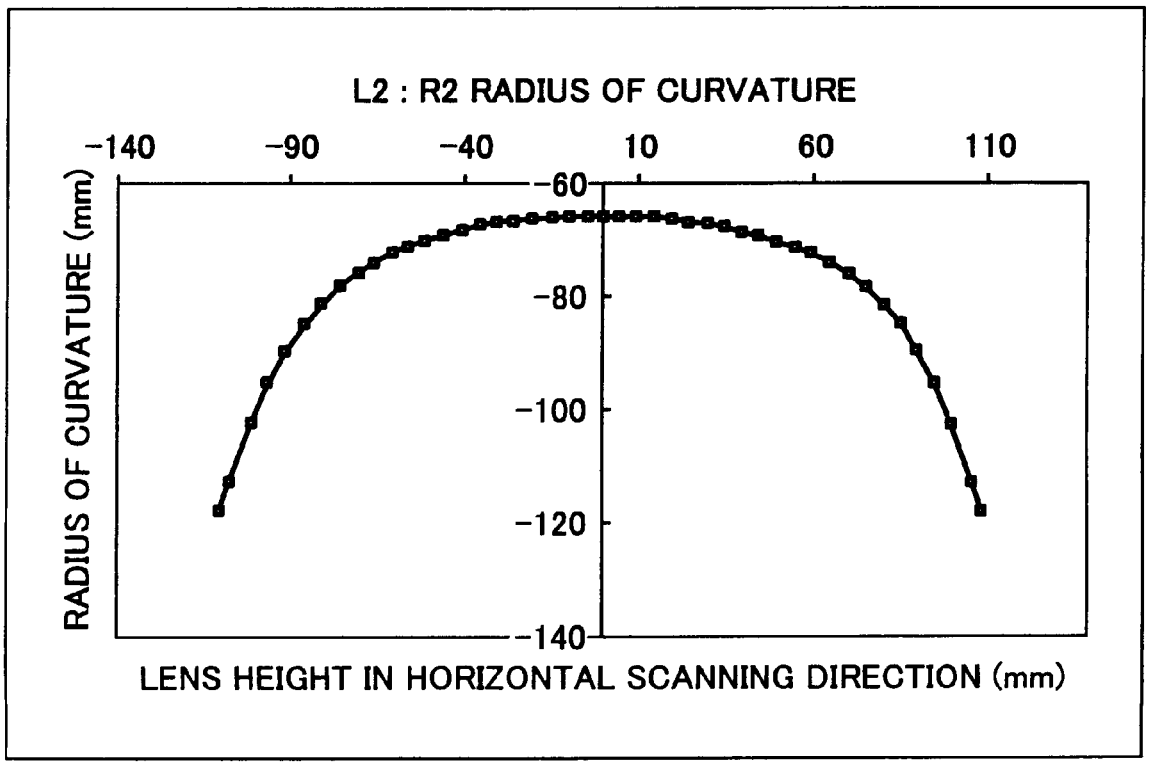
FIG. 7 is a graph of changes in the radius of curvature with respect to the lens height in the horizontal scanning direction, on a second surface of the scanning lens farthest from the deflector in the first example.

FIG. 7 is a graph of changes in the radius of curvature in the vertical scanning direction with respect to the lens height in the horizontal scanning direction, on the second surface (R2) of the second scanning lens (L2) 8.

Figure 8A:
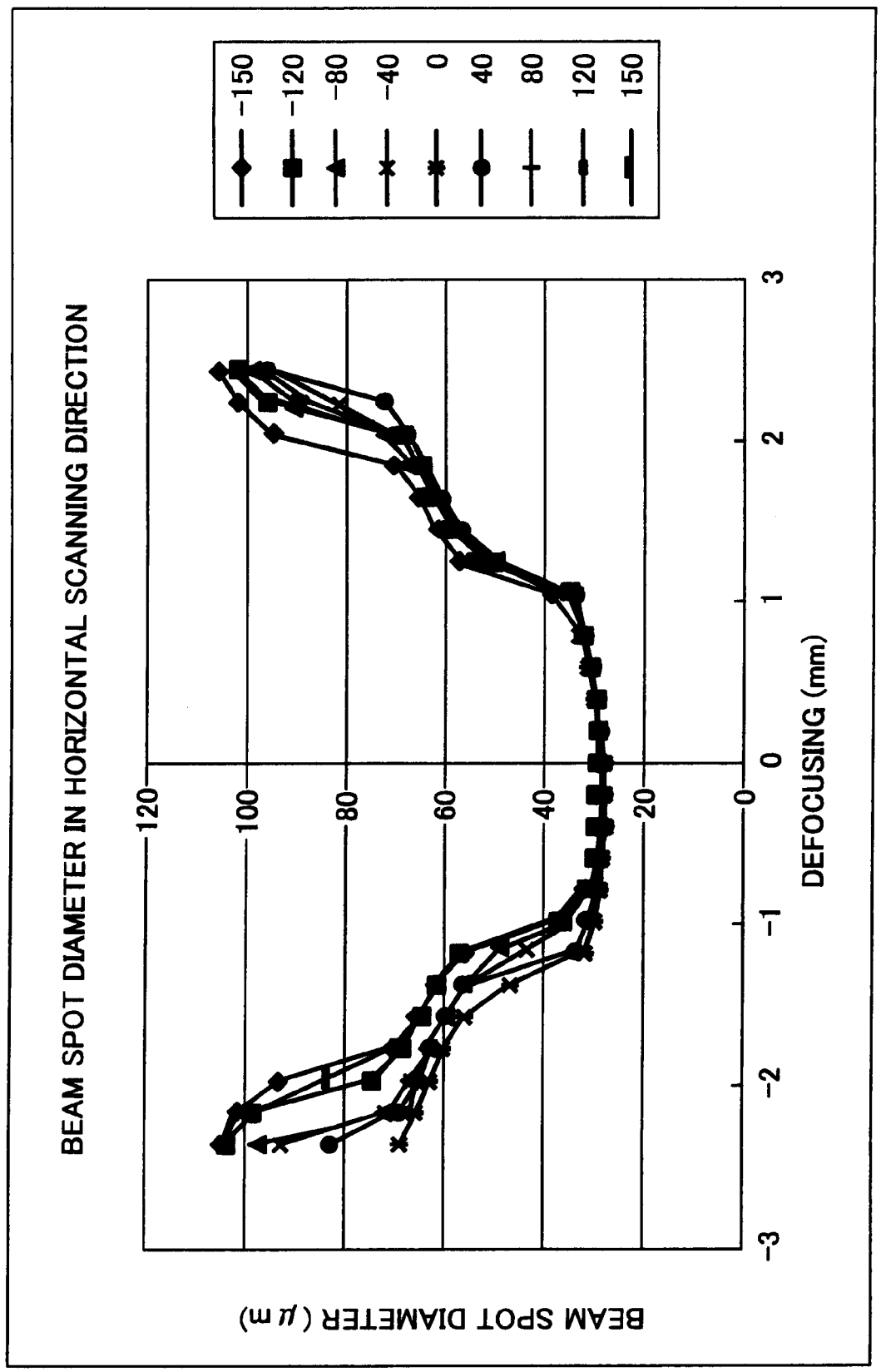
FIGS. 8A and 8B are graphs of beam spot diameter with respect to defocusing in the first example, FIGS. 8A and 8B being graphs showing beam spot diameter in the horizontal scanning direction and in the vertical scanning section, respectively.
Figure 8B:
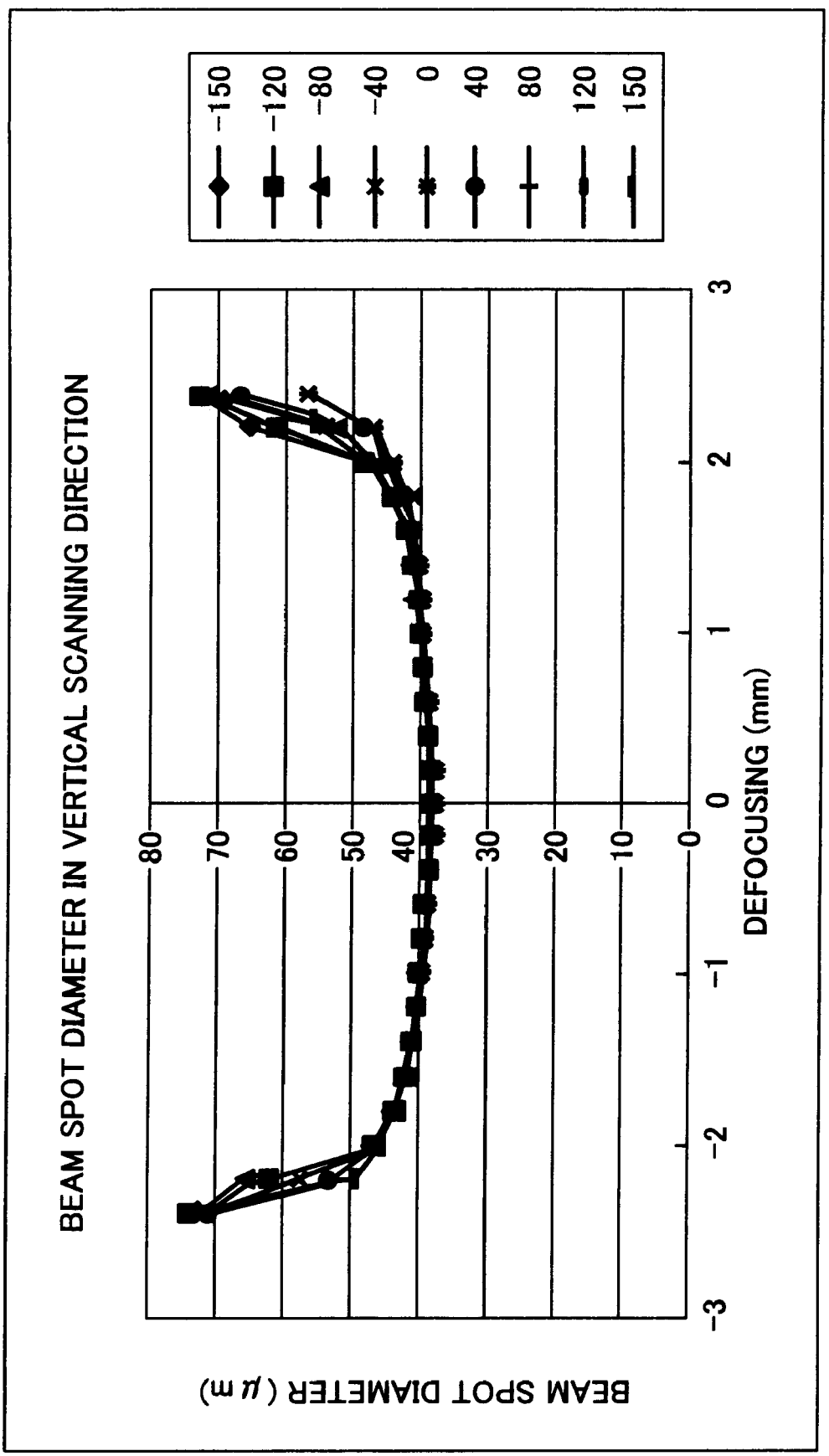

FIGS. 8A and 8B are graphs of beam spot diameter with respect to defocusing, where FIG. 8A illustrates beam spot diameter in the horizontal scanning direction, and FIG. 8B illustrates beam spot diameter in the vertical scanning direction.

The maximum inclination angle of all lens surfaces is 28 degrees of the second surface of the first scanning lens 7.

On the first surface of the first scanning lens 7, and on the first and the second surfaces of the second scanning lens 8, which are the special toric surfaces, the variations in the vertical scanning curvature per 1 mm of the lens height on the respective surfaces are sequentially as follows:

7.9E−05 (1/mm),
7.1E−05 (1/mm),
1.4E−04 (1/mm).

A second example of the optical scanner is explained next.
Wavelength of light source: 655 nm
Focal length of coupling lens: 27 mm
Coupling action: collimating action
Polygon mirror:
  Number of deflection reflecting surfaces: 5
  Inscribed circle radius: 18 mm
Angle between incident angle of beams from light source side and optical axis of scanning optical system: 58 degrees.

The lens data after deflection is as follows.

The first surface of the first scanning lens 7 and both surfaces of the second scanning lens 8 are expressed by the following equations (1) and (2).

Horizontal Scanning Noncircular Equation:

The surface in the horizontal scanning surface is of noncircular shape. Assuming that the paraxial radius of curvature in the horizontal scanning surface on the optical axis is Rm, the distance in the horizontal scanning direction from the optical axis is Y, the conical constant is K, and higher-order coefficients are A1, A2, A3, A4, A5, A6, ... the depth in the direction of the optical axis X is expressed by the following polynomial (1).

$$X = (Y^2/Rm)/[1 + \sqrt{1 - (1+K)(Y/Rm)^2}] + A1 \cdot Y + A2 \cdot Y^2 + A3 \cdot Y^3 + A4 \cdot Y^4 + A5 \cdot Y^5 + A6 \cdot Y^6 + \ldots \quad (1)$$

Here, if a numerical value other than zero is substituted for odd-order coefficients A1, A3, A5, ..., then the depth has an asymmetric shape in the horizontal scanning direction.

Vertical Scanning Curvature Equation:

An equation (2) in which the vertical scanning curvature changes corresponding to the horizontal scanning direction is shown below.

$$Cs(Y) = 1/Rs(0) + B1 \cdot Y + B2 \cdot Y^2 + B3 \cdot Y^3 + B4 \cdot Y^4 + B5 \cdot Y^5 + \ldots \quad (2)$$

Here, if a numerical value other than zero is substituted for odd-order coefficients B1, B3, B5, ..., the radius of curvature in vertical scanning becomes asymmetric in the horizontal scanning direction.

The second surface of the first scanning lens 7 is the rotationally symmetric aspheric surface, and expressed by the following equation (3).

Rotationally Symmetric Aspheric Surface:

When it is assumed that the paraxial radius of curvature on the optical axis is R, the distance in the horizontal scanning direction from the optical axis is Y, the conical constant is K, and higher-order coefficients are A1, A2, A3, A4, A5, A6, ... , the depth in the direction of optical axis X is expressed by the following polynomial.

$$X = (Y^2/R)/[1 + \sqrt{1 - (1+K)(Y/Rm)^2}] + A1 \cdot Y + A2 \cdot Y^2 + A3 \cdot Y^3 + A4 \cdot Y^4 + A5 \cdot Y^5 + A6 \cdot Y^6 + \ldots \quad (3)$$

Specific numerical data is shown below. In the numerical data below, [×10$^{+1}$] is expressed as [E+01], and [×10$^{−7}$] is expressed as [E−07], and the same thing applies hereafter.

Shape of First Surface of First Scanning Lens 7:
  Rm=−303.54, Rs=−61.0
  K=−2.900000E+01
  A4=2.28E−07
  A6=−6.57E−11
  A8=1.18E−14
  A10=−2.10E−19
  A12=8.00E−24
  B1=−1.00E−06
  B2=5.22E−06
  B3=1.70E−08
  B4=−5.06E−11
  B5=−6.80E−12
  B6=−9.46E−14
  B7=−7.34E−16
  B8=−2.10E−17
  B9=−5.03E−19
  B10=7.51E−21

Shape of Second Surface of First Scanning Lens 7:
  R=−85.6
  K=−0.549157
  A4=2.83E−07
  A6=6.04E−12

A8=−1.18E−14
A10=2.26E−18
A12=6.61E−23

Shape of First Surface of Second Scanning Lens 8:
Rm=6950, Rs=94.4
K=0.000000E+00
A4=1.13E−08
A6=9.27E−14
A8=−2.16E−19
A10=−9.18E−22
B1=−4.41E−07
B2=−6.96E−08
B3=−7.45E−11
B4=1.37E−11
B5=−6.44E−16
B6=−3.81E−15
B7=3.04E−18
B8=4.21E−19
B9=−2.33E−22
B10=−1.55E−23

Shape of second surface of second scanning lens 8:
Rm=781.2, Rs=−76.09
K=0.000000E+00
A4=−1.14E−07
A6=9.25E−12
A8=−3.65E−16
A10=9.51E−22
A12=2.38E−25
B2=4.91E−07
B4=−1.64E−11
B6=7.96E−16
B8=1.30E−19
B10=1.47E−23

The refractive index of the scanning lens in the used wavelength is 1.52724 in all lenses.

The specification for the optical arrangement is as follows:
Distance d1 from deflected surface to first surface of first scanning lens 7: 64.1 mm;
Thickness d2 at the center of first scanning lens 7: 22.5 mm;
Distance d3 from second surface of first scanning lens to first surface of second scanning lens: 76 mm; and
Thickness d4 at the center of second scanning lens: 4.9 mm;
Distance d5 from second surface of second scanning lens to surface to be scanned: 158.6 mm.

The soundproof glass 6 and the dustproof glass 9 having a refractive index of 1.514 and a thickness of 1.9 mm are arranged as shown in FIG. 1, and the soundproof glass 6 is inclined by 10 degrees with respect to a direction parallel to the horizontal scanning direction in the deflection surface of revolution.

The F numbers in the vertical scanning direction at the image height in the most peripheral part and the central part of the scanning optical system are given below:
Image height 150 mm: 41.8
Image height 0 mm: 40.8,
Image height −150 mm: 41.1.

FIGS. 11A and 11B are aberration diagrams of the second example as described above. FIG. 11A illustrates the curvature of field, where X-axis indicates defocusing (mm), and Y-axis indicates image height (mm). The solid line indicates the curvature of field in the vertical scanning direction, and the dotted line indicates the curvature of field in the horizontal scanning direction. FIG. 11B illustrates the velocity uniformity, where X-axis indicates percentage, and Y-axis indicates image height (mm). The solid line indicates linearity, and the dotted line indicates fθ characteristic.

Figure 12:
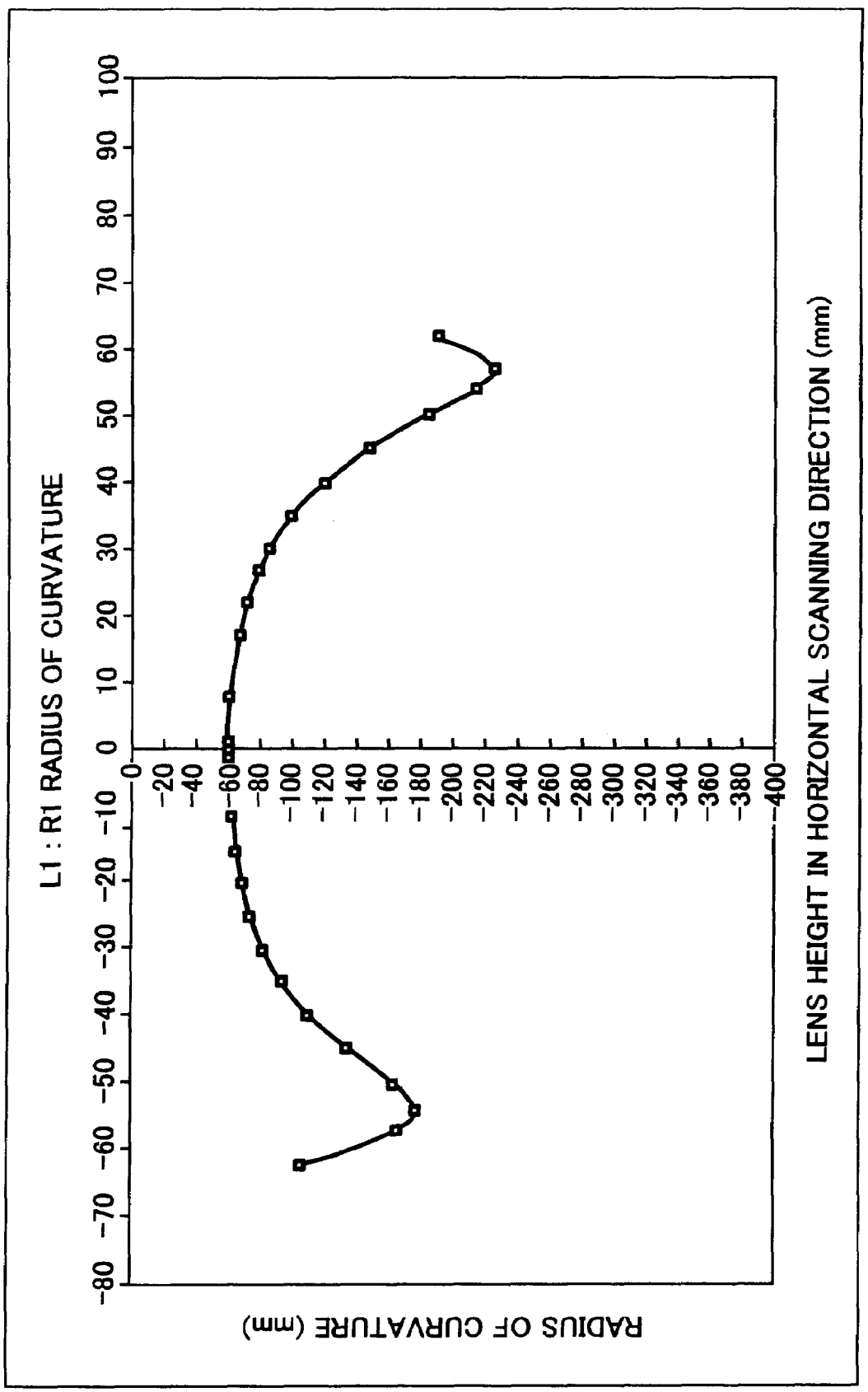
FIG. 12 is a graph of changes in the radius of curvature with respect to the lens height in the horizontal scanning direction, on the surface on the deflector side of the scanning lens closest to the deflector in the second example.
Figure 13:
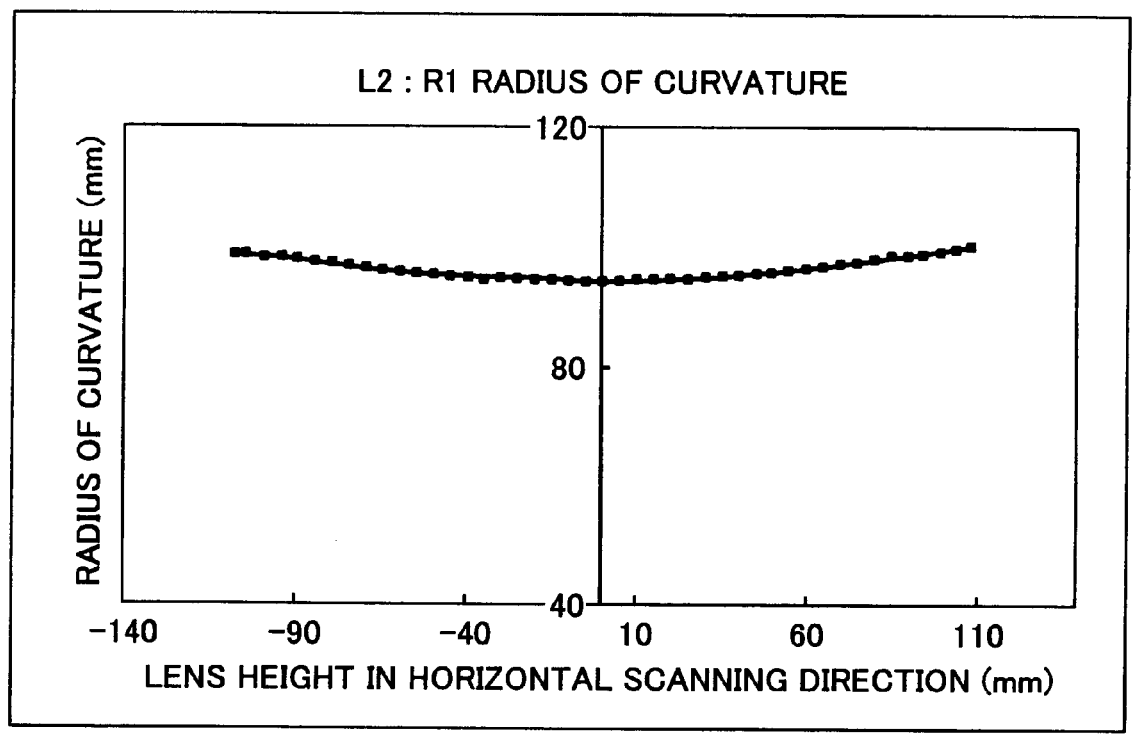
FIG. 13 is a graph of changes in the radius of curvature with respect to the lens height in the horizontal scanning direction, on the surface on the deflector side of the scanning lens farthest to the deflector in the second example.
Figure 14:
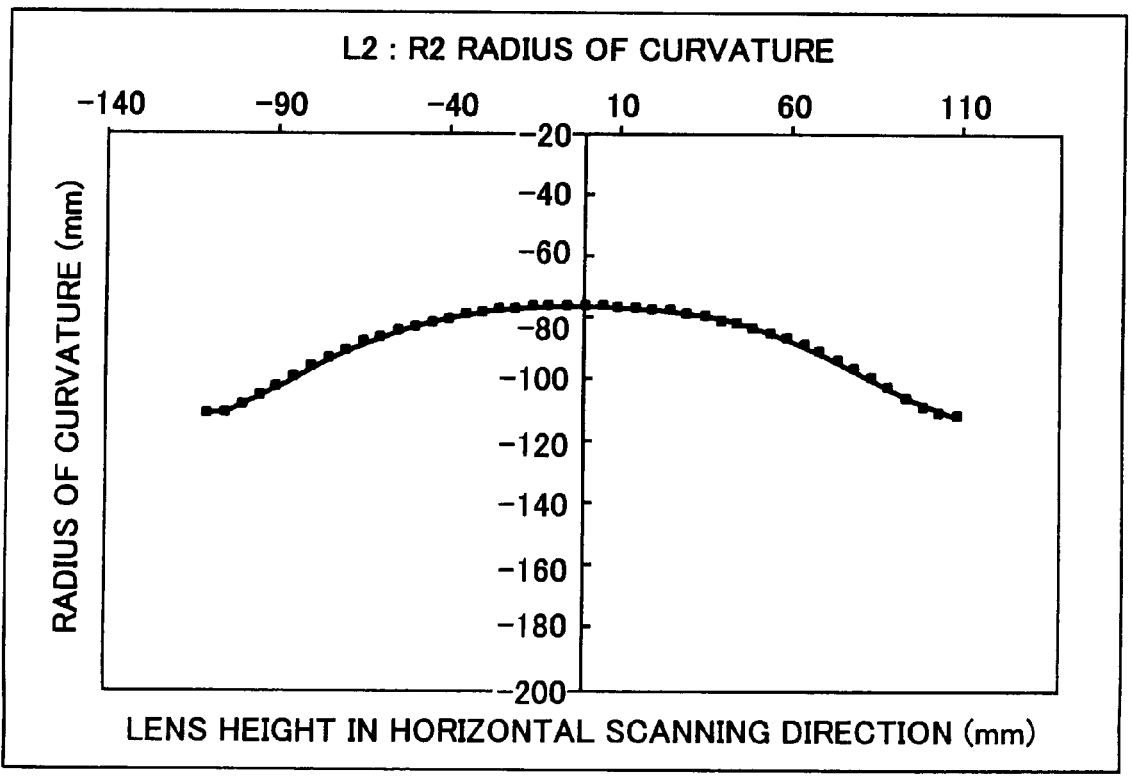
FIG. 14 is a graph of changes in the radius of curvature with respect to the lens height in the horizontal scanning direction, on a second surface of the scanning lens farthest from the deflector in the second example.

FIG. 12 is a graph of changes in the radius of curvature in vertical scanning on the first surface (R1) of the first scanning lens (L1) 7, FIG. 13 illustrates that on the first surface (R1) of the second scanning lens (L2) 8, and FIG. 14 illustrates that on the second surface (R2) of the second scanning lens (L2) 8, and the shapes thereof are as described above.

Figure 15A:
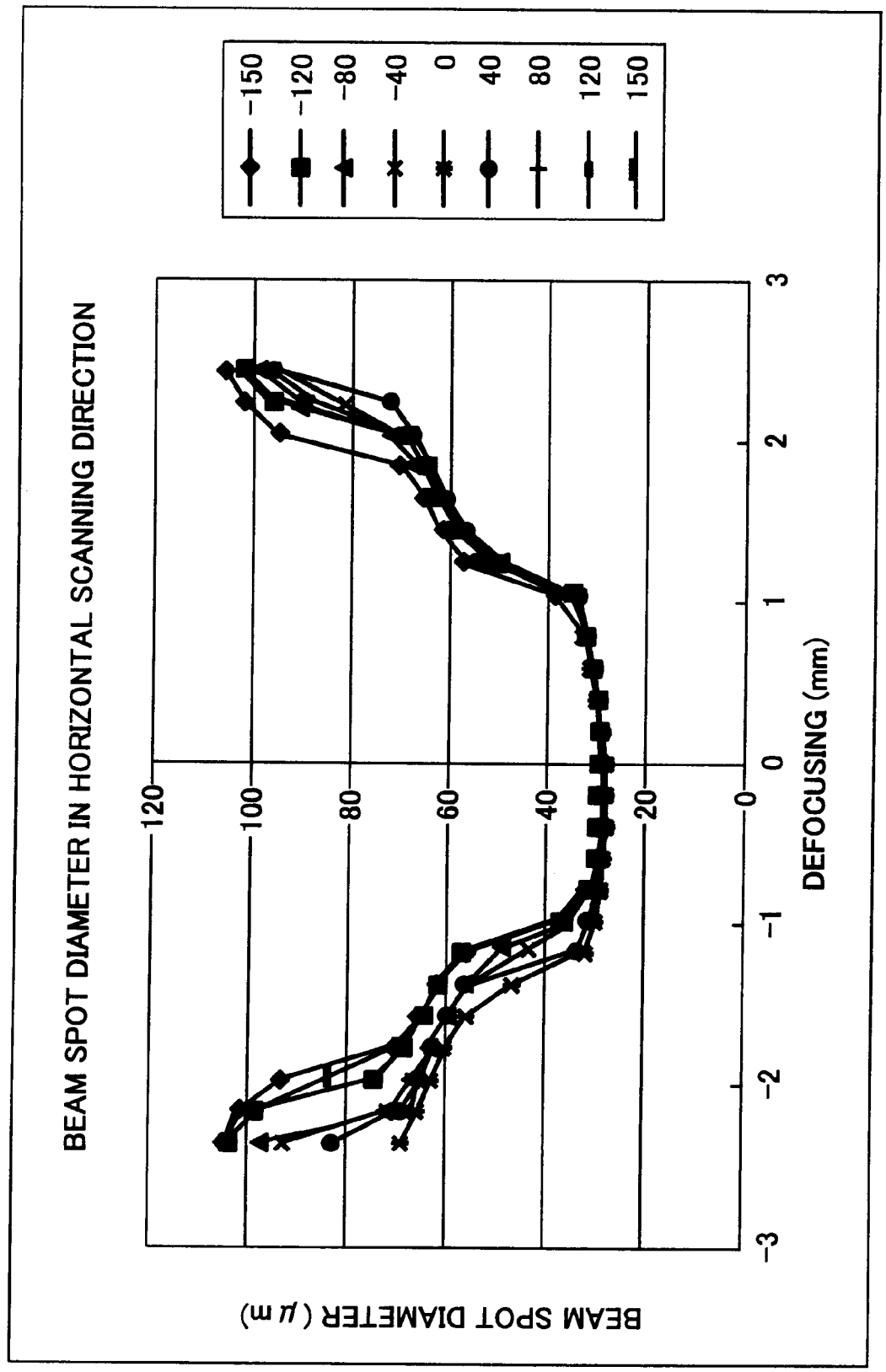
FIGS. 15A and 15B are graphs of beam spot diameter with respect to defocusing in the second example, FIGS. 15A and 15B being graphs showing beam spot diameter in the horizontal scanning direction and in the vertical scanning section, respectively.
Figure 15B:
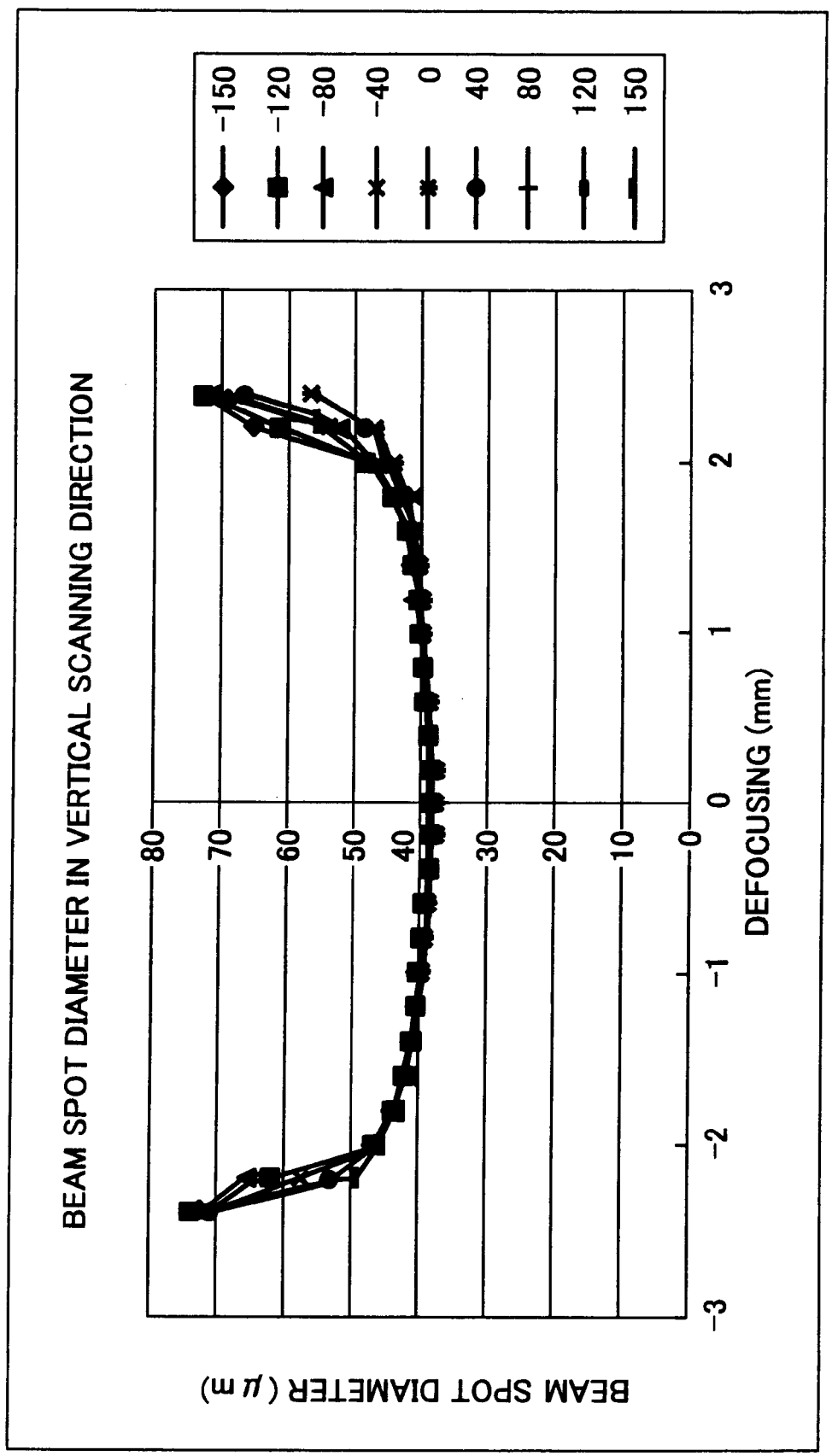

FIGS. 15A and 15B are graphs of beam spot diameter with respect to defocusing, where FIG. 15A illustrates beam spot diameter in the horizontal scanning direction, and FIG. 15B illustrates beam spot diameter in the vertical scanning direction.

In the first and second examples of the optical scanner, the scanning optical system is formed of two lenses, that is, the first scanning lens and the second scanning lens. However, there may be three or more scanning lenses. In that case, the expected action and operation can be obtained by satisfying the configuration requirements described in the various claims.

In the examples, the light source is a semiconductor laser (laser diode (LD)). However, the present invention is also applicable to a multi-beam optical system using a plurality of semiconductor lasers as the light source, and an LD array having a plurality of light emitting points. If a resin lens is used as the scanning lens, then the scanning lens having the special toric surface or the rotationally symmetric aspheric surface can be mass-produced by die forming, thereby reducing cost.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical scanner comprising:
a light source;
an optical coupler that couples beams from the light source;
an optical line image unit that forms a line image of the beams from the optical coupler, wherein the line image is longer in a horizontal scanning direction than in a vertical scanning direction;
a deflector that deflection-scans the beams from the optical line image unit; and
an optical scanning unit that includes a plurality of scanning lenses that guide the beams from the deflector to a surface to be scanned, wherein
a scanning lens closest to the deflector has a meniscus shape with a concave facing the deflector side in the horizontal scanning direction,
a surface close to the deflector, of the scanning lens closest to the deflector, has a negative power in the vertical scanning direction, and is a special toric surface in which a radius of curvature in a vertical scanning decreases from an optical axis of the lens surface toward a periphery of the horizontal scanning direction and increases bordering on an extreme value, and
the surface close to the deflector, of a scanning lens farthest from the deflector, has a convex shape toward the deflector side in the horizontal scanning direction, and the scanning lens farthest from the deflector has a negative power in the horizontal scanning direction.

2. An image forming apparatus that forms an image on transfer paper by executing respective charging, exposure, development, and transfer processes, comprising:

an exposing unit that executes the exposure process, including
  a light source;
  an optical coupler that couples beams from the light source;
  an optical line image unit that forms a line image of the beams from the optical coupler, wherein the line image is longer in a horizontal scanning direction than in a vertical scanning direction;
  a deflector that deflection-scans the beams from the optical line image unit; and
  an optical scanning unit that includes a plurality of scanning lenses that guide the beams from the deflector to a surface to be scanned, wherein a scanning lens closest to the deflector has a meniscus shape with a concave facing the deflector side in the horizontal scanning direction, a surface close to the deflector, of the scanning lens closest to the deflector, has a negative power in the vertical scanning direction, and is a special toric surface in which a radius of curvature in a vertical scanning decreases from an optical axis of the lens surface toward a periphery of the horizontal scanning direction and increases bordering on an extreme value, the surface close to the deflector, of a scanning lens farthest from the deflector, has a convex shape toward the deflector side in the horizontal scanning direction, and the scanning lens farthest from the deflector has a negative power in the horizontal scanning direction.

* * * * *